United States Patent
Foster et al.

(10) Patent No.: US 7,210,352 B2
(45) Date of Patent: May 1, 2007

(54) MEMS TEETER-TOTTER APPARATUS WITH CURVED BEAM AND METHOD OF MANUFACTURE

(75) Inventors: John S. Foster, Santa Barbara, CA (US); Paul J. Rubel, Santa Barbara, CA (US)

(73) Assignee: Innovative Micro Technology, Goleta, CA (US)

( * ) Notice: Subject to any disclaimer, the term of this patent is extended or adjusted under 35 U.S.C. 154(b) by 24 days.

(21) Appl. No.: 11/151,442

(22) Filed: Jun. 14, 2005

(65) Prior Publication Data

US 2006/0277997 A1   Dec. 14, 2006

(51) Int. Cl.
   *G01P 15/125* (2006.01)
(52) U.S. Cl. .................... 73/514.32; 73/514.38
(58) Field of Classification Search ............. 73/514.32, 73/514.29, 514.36, 514.38, 514.16, 504.12, 73/504.14, 504.04
   See application file for complete search history.

(56) References Cited

U.S. PATENT DOCUMENTS

| | | | | |
|---|---|---|---|---|
| 5,488,864 A | * | 2/1996 | Stephan | .................. 73/514.32 |
| 5,574,221 A | * | 11/1996 | Park et al. | ................ 73/514.02 |
| 5,831,164 A | * | 11/1998 | Reddi et al. | ............. 73/514.01 |
| 5,959,208 A | | 9/1999 | Muenzel et al. | |
| 6,787,969 B2 | | 9/2004 | Grade et al. | |
| 6,845,670 B1 | * | 1/2005 | McNeil et al. | ........... 73/514.32 |
| 6,910,379 B2 | * | 6/2005 | Eskridge et al. | ......... 73/504.14 |
| 6,935,175 B2 | * | 8/2005 | Eskridge et al. | ......... 73/514.32 |
| 6,955,086 B2 | * | 10/2005 | Yoshikawa et al. | ...... 73/514.32 |
| 7,004,027 B2 | * | 2/2006 | Suzuki | .................. 73/514.32 |
| 2003/0036214 A1 | | 2/2003 | Eskridge | |
| 2003/0106372 A1 | | 6/2003 | Adams et al. | |
| 2004/0035206 A1 | | 2/2004 | Ward et al. | |
| 2004/0160232 A1 | | 8/2004 | Yue et al. | |

* cited by examiner

*Primary Examiner*—Helen Kwok
(74) *Attorney, Agent, or Firm*—Jaquelin Spong

(57) ABSTRACT

A teeter-totter apparatus uses a curved beam to generate a differential output which may be indicative of an acceleration applied to the apparatus. The curved-beam teeter-totter apparatus can be combined with an x-axis and y-axis accelerometer, to produce a tri-axis accelerometer which is sensitive to an acceleration applied in any direction. Damping plates may be added to the accelerometers to reduce unwanted motion.

20 Claims, 18 Drawing Sheets

MEMS TEETER-TOTTER APPARATUS WITH CURVED BEAM AND METHOD OF MANUFACTURE

BACKGROUND

This invention is directed to microelectromechanical systems (MEMS) which are used as accelerometers. In particular, this invention is directed to a MEMS accelerometer which achieves differential output using a curved beam Microelectromechanical systems (MEMS) are devices which may be fabricated using semiconductor thin film technology in order to reduce the characteristic dimensions of the devices. MEMS technology is often applied to the design and fabrication of sensors in particular, because the range of motion in such devices is generally limited, compared to, for example, a motor or actuator. MEMS technology has been applied to the design and fabrication of accelerometers, for example, which detect and measure the presence of accelerative forces.

One example of a prior art MEMS accelerometer is shown in FIG. 1. The MEMS accelerometer 100 may include a beam 130 suspended over a substrate 140 on a fulcrum 150. The beam 130 may include two conductive layers 170a and 170b which may be deposited on the beam 130. Opposite conductive layers 170a and b may be a second pair of conductive layers 180a and 180b, deposited on substrate 140, aligned to correspond to the upper conductive layers 170a and 170b. The beam 130 may also include a proof mass 120, which may render the teeter-totter beam 130 asymmetric, and allow it to respond to the application of an accelerative force 110. The two pairs of conductive layers 170a and 180a, and 170b and 180b may form two pairs of parallel plate capacitors. The top and bottom layers 170a and 180a, and 170b and 180b may have a specific capacitance based on their width, length, and the gap between them. The signal obtained is the capacitance between the top and bottom layers 170a and 180a on left side, and the capacitance between the top and bottom layers on the right side.

In operation, the signal from one set of capacitor plates, for example 170a and 180a, may be subtracted from the signal from the second set of capacitor plates; 170b and 180b. This subtraction may remove sources of DC errors, such as differences in the exact dimensions of the conductive layers, or the, nominal separation between them under zero acceleration conditions. Such differential approaches may be important to improving the accuracy of such accelerometers.

The device shown in FIG. 1 is known as a teeter-totter accelerometer, because a beam 130 pivots on a fulcrum 150. When an acceleration 110 is applied to accelerometer 100, the proof mass 120 causes the beam 130 to rotate clockwise about the fulcrum 150. The beam can pivot on the fulcrum but there is a resistance to movement that is proportional to the angle of rotation. This may be referred to as an angular spring rate. The proof mass 120 that is attached to one end of the beam 130 may apply a force to the end of the beam 130 when the teeter-totter accelerometer 100 is subjected to acceleration 110. The force may cause the beam 130 to rotate in the appropriate direction a distance at which the force of acceleration on the mass equals the resistive force of the spring at the fulcrum 150.

The pivoting motion may cause the gap 175 between the first set of capacitor plates, 170a and 180a, to increase, and the gap 185 between the second set of capacitor plates 170b and 180b, to decrease. Therefore, the capacitance signal $S_a$ from capacitor plates 170a and 180a may decrease by an amount $\alpha$ as a result of the applied acceleration 110, and the capacitance signal $S_b$ from the second set of capacitor plates 170b and 180b, may increase by an equal amount, $\Delta$. Therefore, subtracting the change in capacitance of one set of plates 170a and 180a from the change in capacitance of the second set of capacitor plates 170b and 180b, may produce a signal $\Delta S$ which is twice the amplitude of a single set of capacitor plates, with none of the DC offset. This condition may be expressed mathematically as:

$$\Delta S = \Delta S_a - \Delta S_b = (S_a - \Delta - S_a) - (S_b + \Delta - S_b) = -2\Delta \quad (1)$$

wherein $\Delta S_a$ and $\Delta S_b$ are the changes in the signal from the left and right set of capacitor plates, respectively. Accordingly; monitoring the change in the differential output of the first set of capacitor plates 170a and 180a relative to the change in capacitance of the second set of capacitor plates 170b and 180b, may determine the magnitude and sign of accelerations applied perpendicular to the plane of the teeter-totter accelerometer 100.

SUMMARY

However, the teeter-totter accelerometer 100 may be difficult and expensive to fabricate using MEMS techniques. Most MEMS processes are directional, acting in a direction perpendicular to the plane of the substrate. For example, the etching of substrate material tends to occur downward perpendicularly into the substrate 140. Deposition tends to occur upwards perpendicularly from the substrate 140. Therefore, the deposition especially of capacitor plates 170a and 170b is very difficult to achieve, because it may occur after the formation of teeter-totter beam 130, and therefore, the deposition may occur in the opposite direction compared to normal fabrication processes. In addition, the parallelism of capacitor plates 170a and 170b with the lower capacitor plates 180a and 180b may need to be maintained during and after the deposition of plates 170a and 170b. Therefore, in order to create the teeter-totter accelerometer shown in FIG. 1, the teeter-totter beam 130 and capacitor plates 170a and 170b may be fabricated separately from the rest of the device, and then installed on the corresponding fulcrum 150, lower capacitor plates 180a and 180b, and substrate 140. This may increase the expense of fabricating the teeter-totter accelerometer design shown in FIG. 1.

In the teeter-totter apparatus described here, an accelerometer may be designed such that it can be fabricated using directional etching and deposition technologies. In particular, the teeter-totter apparatus described here may have the capacitor plates vertically oriented, perpendicular to the substrate surface. The capacitor plates may be arranged as banks of interdigitated fingers, to increase the signal for a given movement due to an acceleration The surfaces of the capacitor plates may therefore be created using the usual directional etching techniques. A differential output signal may be achieved by curving the beams of the teeter-totter apparatus using, for example, a stressed material deposited over the teeter-totter beam. The performance of the teeter-totter apparatus may be improved by including damping structures in the design, which attenuate unwanted movement of the accelerometer.

The teeter-totter apparatus therefore may include at least one curved beam which pivots on a pivot point coupled to a substrate surface, and which is coupled to at least one moveable plate of a capacitor, a proof mass coupled to one end of the curved beam, and at least one stationary structure coupled to the substrate which defines at least one stationary plate of the capacitor, wherein the moveable plate and the stationary plate are oriented perpendicular to a plane defined by the substrate surface. Electrical connection may be made to the at least one stationary plates and the at least one moveable plate using an over-etch technique, which maintains electrical isolation between a plurality of contact pads, as is described further below.

The resulting teeter-totter apparatus may be batch-fabricated inexpensively, using standard MEMS processing.

In addition, the teeter-totter design may also accommodate the inclusion of an x-axis and y-axis accelerometer, to provide a three-axis accelerometer which produces three differential output signals in response to an acceleration applied along any direction. The three-dimensional accelerometer may therefore measure not only the magnitude of the acceleration, but also the exact orientation of its application.

These and other features and advantages are described in, or are apparent from the following detailed description.

BRIEF DESCRIPTION OF THE DRAWINGS

Various exemplary details are described with reference to the following figures, wherein.

DETAILED DESCRIPTION

In the systems and methods described herein, a teeter-totter apparatus is described which may be manufactured using standard, directional, MEMS processing techniques. The teeter-totter apparatus may have a set of capacitor plates which may be arranged as banks of interdigitated fingers. The capacitor plates may be vertically oriented, perpendicular to the surface of a substrate and may be composed of silicon, and may therefore be formed using standard lithographic etching processes.

The systems and methods are described with reference to a teeter-totter accelerometer embodiment, however, it should be understood that the systems and methods nay also be applied to other devices, such as push/pull actuators.

Figure 1:
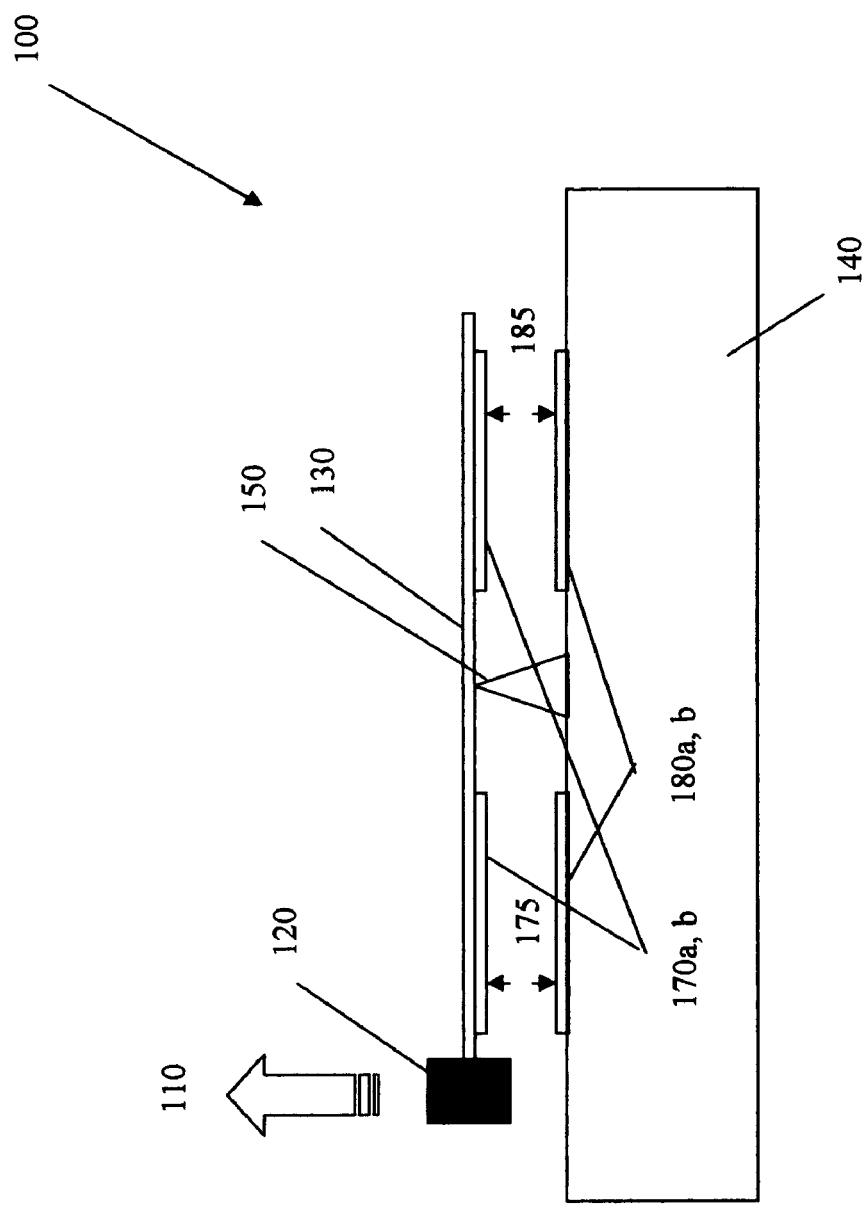
FIG. 1 is an illustration of a prior art teeter-totter accelerometer.
Figure 2:
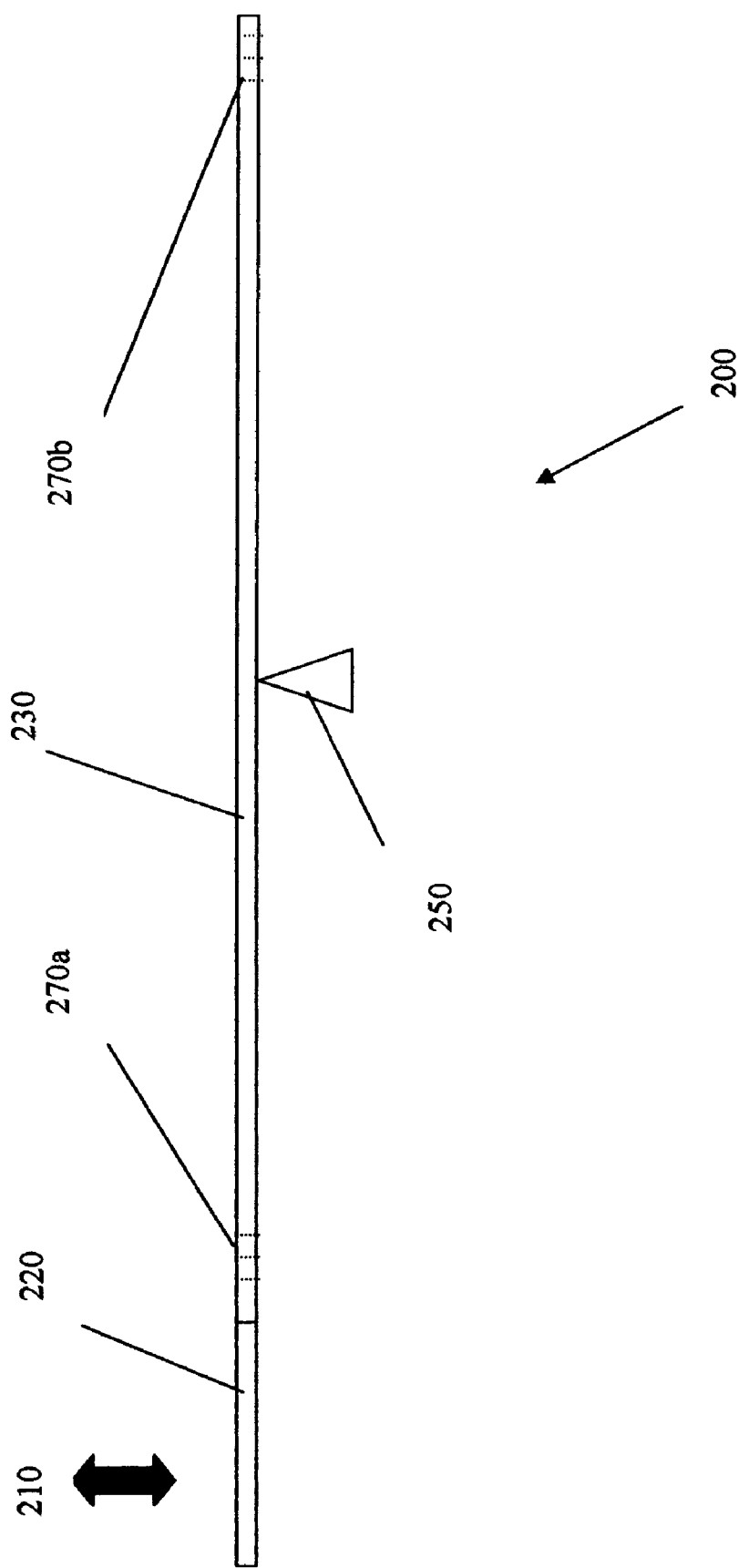
FIG. 2 is an illustration of an exemplary teeter-totter accelerometer with interdigitated fingers.

FIG. 2 is an illustration of an exemplary accelerometer 200 with vertically oriented capacitor plates. The capacitor plates may be made up of two banks of interdigitated fingers, one set on the left side 270a, and one set on the right side 270b. The capacitor banks may be made up of a moving portion defined in the teeter-totter beam 230, and a stationary portion (not shown in FIG. 2) which remains affixed to a stationary substrate. The geometry of the interdigitated fingers is discussed in greater detail below, with respect to FIGS. 4 and 5. A proof mass 220 may be disposed outboard of the left bank of interdigitated fingers 270a. Alternatively, the proof mass may be disposed outboard of the right bank of interdigitated fingers 270b. In either case, the proof mass may serve to render the teeter-totter beam 230 asymmetrical, as the portion to one side of the fulcrum 250 has more mass than the portion to the other side of the fulcrum 250. Therefore, the teeter-totter accelerometer 200, when an acceleration 210 is applied along the axis shown, may rotate clockwise or counterclockwise about the fulcrum 250, depending on the direction of the acceleration 210.

Figure 3:
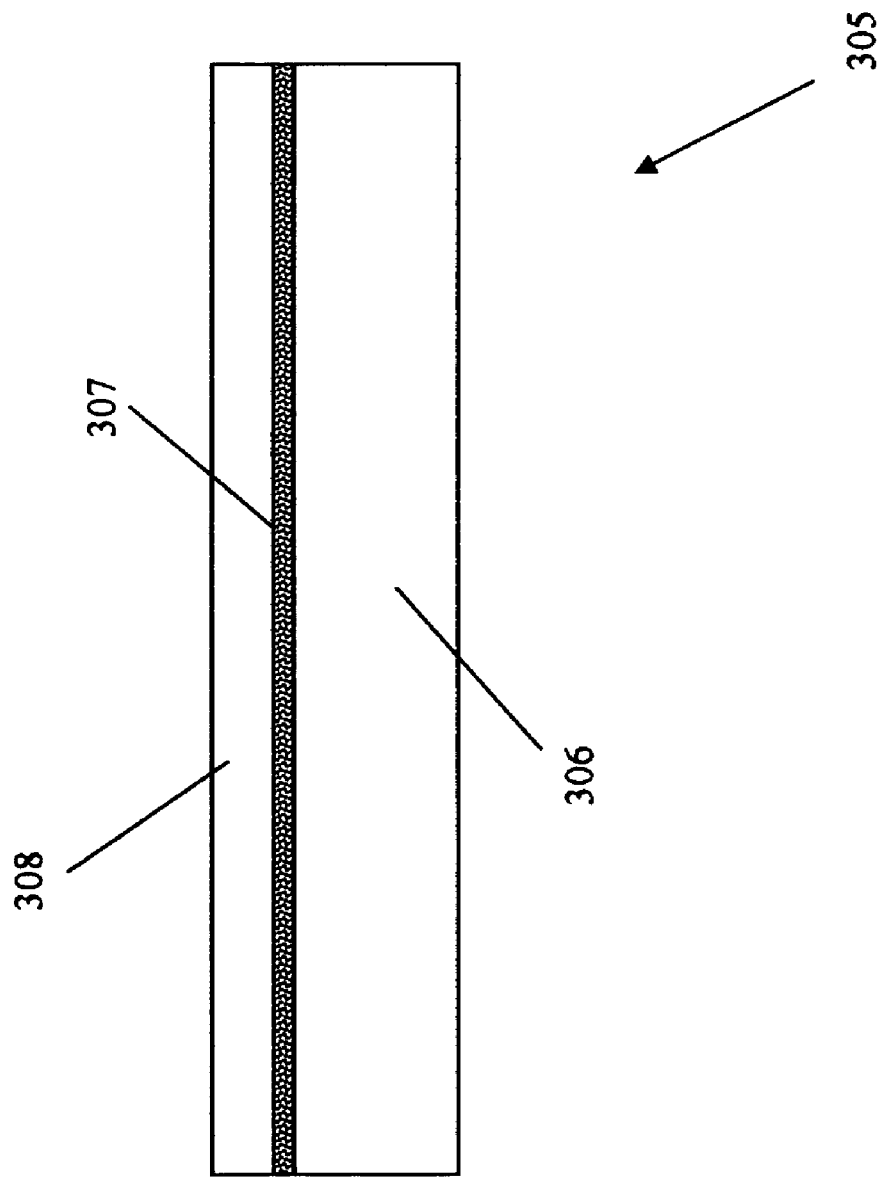
FIG. 3 shows an exemplary silicon-on-insulator wafer, useable for fabricating the teeter-totter accelerometer shown in FIG. 2.

The teeter-totter accelerometer 200 may be made using the wafer illustrated in FIG. 3. FIG. 3 shows a silicon-on-insulator (SOI) sandwich wafer 305, which consists of a silicon "handle" wafer 306, about 675 μm thick, over which a layer of silicon dioxide 307 ($SiO_2$) is grown to a thickness for example 0.5 to 2 μm. Over the silicon dioxide layer, another layer (the "device" layer) of crystalline or amorphous silicon 308 is grown, adhered or deposited. The device layer 308 may generally be thinner than the handle wafer, for example, between about 1 and about 80 μm thick.

Figure 4:
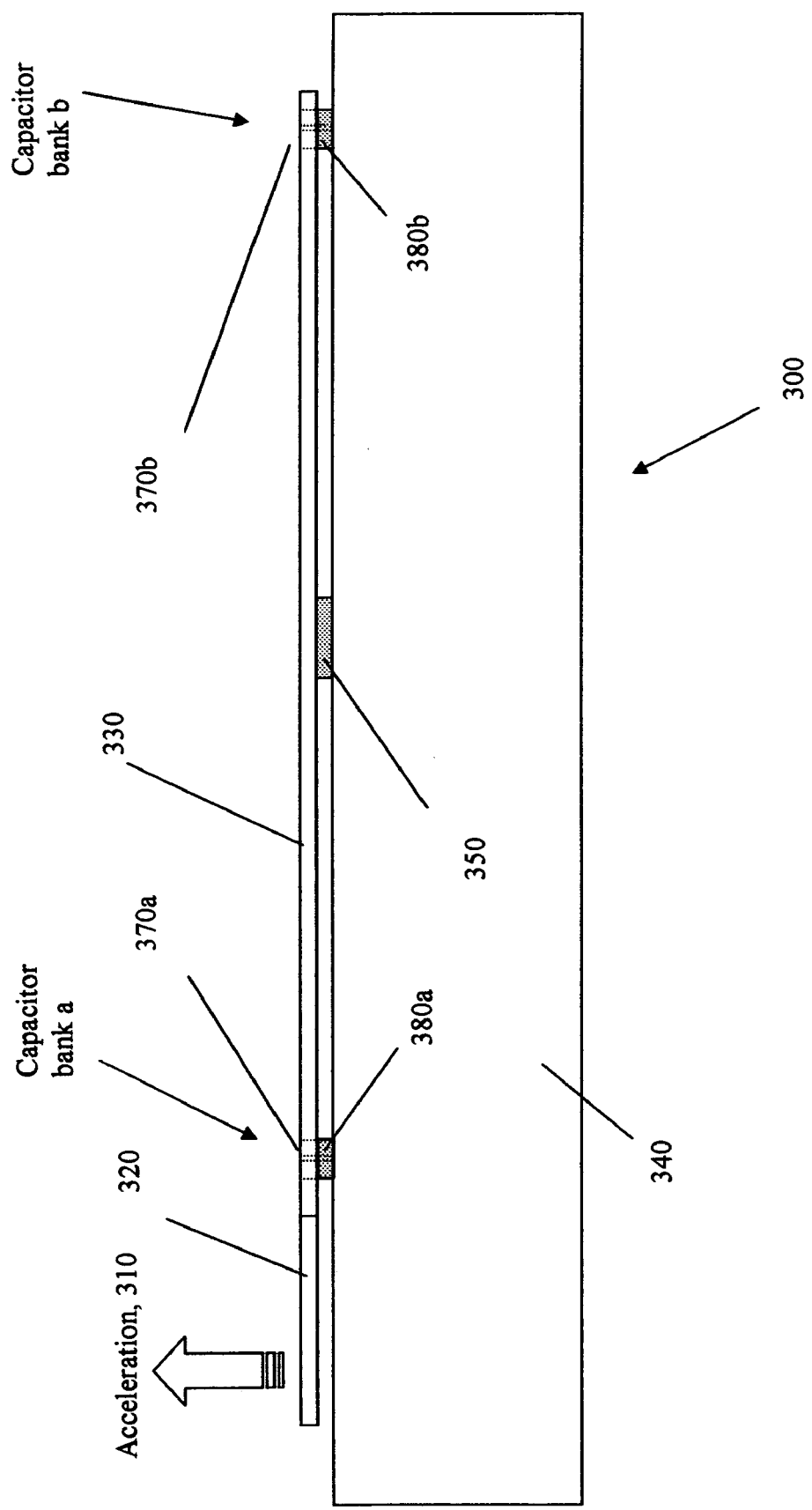
FIG. 4 is a schematic diagram of an exemplary embodiment of a teeter-totter accelerometer fabricated on the substrate of FIG. 3.

The teeter-totter accelerometer 300 is fabricated by patterning the device features through the device layer 308 of the SOI wafer 305 to the silicon dioxide layer 307. The removal of the silicon dioxide layer 307 then releases the moving part from the substrate, which will then form a teeter-totter beam 330, as shown in FIG. 4. Electrical contact is then made to each of the electrically separated components of the crystalline or amorphous layer 308, using a process described in further detail below with respect to FIGS. 7 and 8.

The teeter-totter accelerometer 300 may be made using the wafer shown in FIG. 3, and is shown in further detail in FIG. 4. The teeter-totter accelerometer 300 may have two capacitor banks, a left capacitor bank a, and a right capacitor bank b. Each of the capacitor banks may include a vertically oriented moving plate which may be a set of moveable interdigitated fingers 370a and 370b, respectively, and a vertically oriented stationary plate which may be a set of stationary interdigitated fingers 380a and 380b. The purpose of providing the capacitor plates as sets of interdigitated fingers may be to increase the total area of the plates of the plate capacitor, and thereby increase the signal acquired from each of the left capacitor bank a and the right capacitor bank b.

To release the teeter-totter accelerometer 300 shown in FIG. 4, the silicon dioxide layer 350 may be etched from underneath the crystalline or amorphous silicon layer to form a teeter-totter beam 330 as shown in FIG. 4. The silicon dioxide is exposed to an etchant and is chemically etched underneath the device features, thus freeing them The silicon dioxide is not removed in specific areas in order to anchor the structure. The portion of the silicon dioxide layer which remains under the beam 330 is located adjacent to the fulcrum of the beam This fulcrum 350, anchors the teeter-totter beam 330 to the handle wafer 340. The free portion of the beam immediately adjacent to the anchor may provide the angular (torsional) spring rate at the fulcrum 350, discussed above with respect to teeter-totter accelerometer 100. In particular, the fulcrum section of the beam adjacent to the fulcrum anchor 350 provides a restoring force which resists the rotation of the teeter-totter beam 330 under acceleration. The teeter-totter beam 330 will cease to rotate when the restoring force of the fulcrum 350 exceeds the inertia of the proof mass 320 under acceleration Silicon dioxide also remains over the portion of the handle wafer 340 that will form the stationary portion of the interdigitated fingers 380a and 380b shown in FIG. 4. These portions remain firmly adhered to the handle wafer 340, such that they do not move when an acceleration is applied to the accelerometer. The silicon dioxide layer under the stationary portion 380a and 380b of the interdigitated fingers is not fully chemically etched. The chemical etchant used to remove the silicon dioxide underneath the moving beam etches the same amount of silicon oxide from underneath the stationary portion. The width, however, of these stationary portions are considerably larger than the moving beam structure. Therefore a significant amount of silicon dioxide remains underneath the stationary portion.

Figure 5:
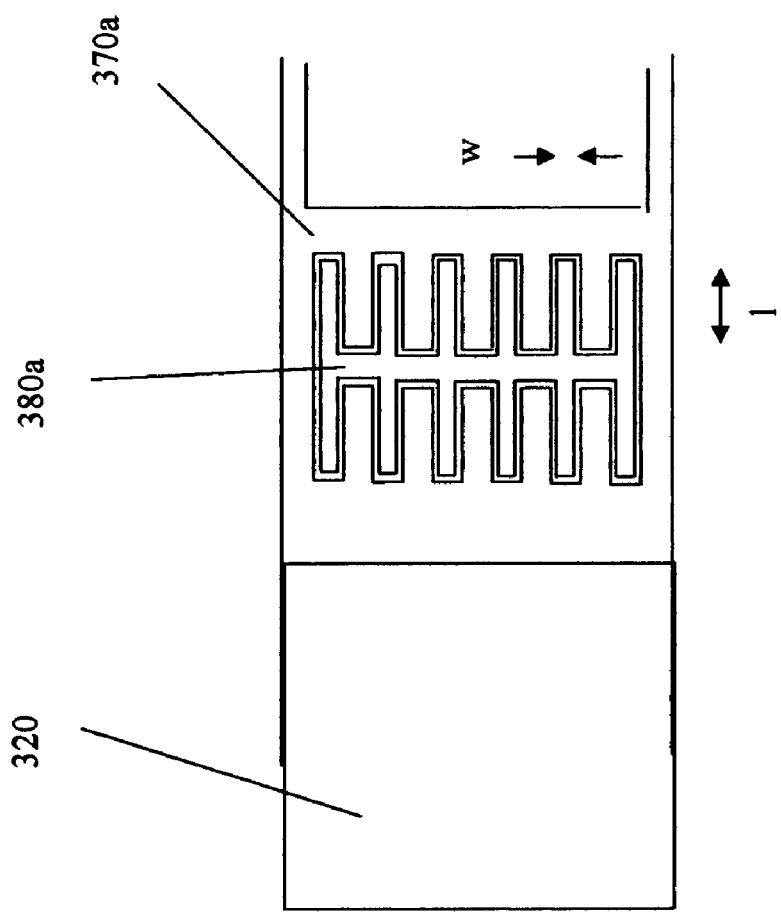
FIG. 5 is a plan view of a first exemplary embodiment of the interdigitated fingers of a teeter-totter accelerometer.

Before etching the silicon dioxide layer 350, the top layer of crystalline or amorphous silicon 330 may be patterned using standard patterning technologies, to create the pattern of the interdigitated fingers. The patterning may determine the layout of the moving portions 370a and 370b and stationary portions 380a and 380b of the interdigitated fingers of the left and right capacitor banks a and b. For example, the pattern shown in FIG. 5 may be used. FIG. 5 shows a partial pattern for the interdigitated fingers, wherein the moving portion 370a of the interdigitated comb may completely surround the stationary portion 380a of the crystalline or amorphous silicon which may remain over the substrate 340. FIG. 5 depicts the left side (the "a" side) portion of the teeter-totter accelerometer 300 shown in FIG. 4. Although FIG. 5 depicts only six pairs of interdigitated fingers, it should be understood that in actuality, many more sets may be provided, as allowed by the layout and dimensions of teeter-totter accelerometer 300. In fact, the number of sets of interdigitated fingers should, in general, be a large number because this number may contribute directly to the magnitude of the output signal from teeter-totter accelerometer 300.

It should also be understood that although FIG. 5 depicts only the left side of teeter-totter accelerometer 300, the right side (the "b" side) of the accelerometer may be similarly designed. Since the moving portion 370a of the interdigitated fingers surrounds the stationary portion 380a, the proof mass 320 may simply be an extension which extends beyond the interdigitated fingers 370a This layout for the interdigitated fingers may be advantageous in that no additional structures or assembly are needed for the proof mass 320.

The interdigitated fingers of stationary portion 380a and moveable portion 370a may have a characteristic length, l of; for example, about 25 µm, as shown in FIG. 5. The interdigitated fingers of stationary portion 380a may also have a characteristic width, w, of, for example, about 3 µm These dimensions are intended to be exemplary only, and other dimensions in keeping with the design considerations set forth herein may also be employed in the design of teeter-totter accelerometer 300. In general, the width of stationary fingers and moveable fingers should be made as small as possible, in order to increase the number of such fingers included in capacitor banks a and b. The pitch between each finger may be made sufficiently large that a gap exists between the surfaces of moveable fingers 370a and stationary fingers 380a under all conditions, such that the surfaces of moveable fingers 370a do not interfere with the surfaces of stationary fingers 380a under any operating or non-operating conditions. An exemplary pitch for the dimensions set forth above may be 10 µm. It should be clear that reducing or increasing the pitch between the stationary or moving fingers may increase or decrease the capacitance and the capacitance change during operation of the device.

Figure 6:
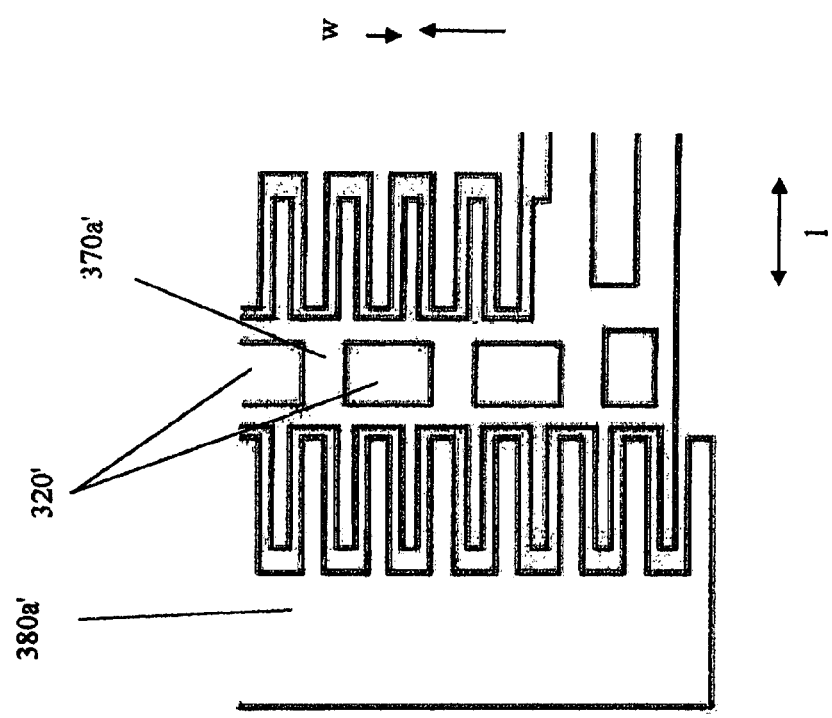
FIG. 6 is a plan view of a second exemplary embodiment of the interdigitated fingers of a teeter-totter accelerometer.

An alternative to the design shown in FIG. 5, is shown in FIG. 6. FIG. 6 shows an embodiment of the teeter-totter accelerometer designed such that the moving portions of the interdigitated fingers 370a' are nearly entirely surrounded by the stationary portions 380a' of the interdigitated comb. Using the approach shown in FIG. 6, if the proof mass is to be attached to such an interdigitated bank, the proof mass 320 may need to be elevated on platforms 320', in order to avoid having the proof mass 320 interfere with the stationary comb 380a'. As will be further discussed below, it may be advantageous to combine the design shown in FIG. 6 with the design shown in FIG. 5, in order to further increase the area included in the capacitor banks a and b, which contribute to the signal, by having alternating rows of the design of FIG. 5 with the design of FIG. 6.

The length and width of the interdigitated fingers shown in FIG. 6 may be similar to those shown in FIG. 5, such as, for example 25 µm and 3 µm, respectively. The pitch of the interdigitated fingers may also be similar to that of FIG. 5, of about 10 µm.

Figure 7:
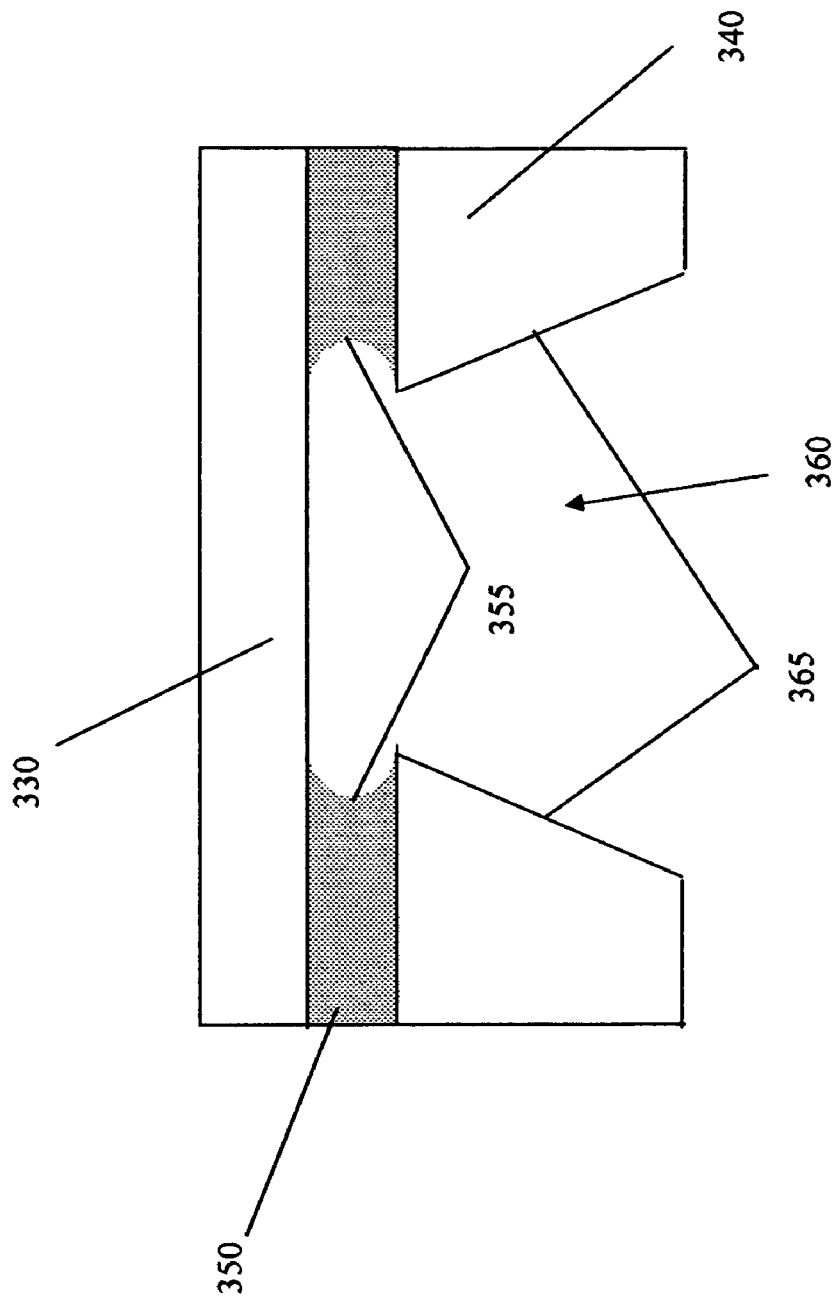
FIG. 7 is an illustration of an exemplary fabrication technique for making through holes to contact the components of the teeter-totter accelerometer.

Electrical contact may be made to the teeter-totter accelerometer 300 using a process illustrated, for example, in FIG. 7. As shown in FIG. 7, vias 360 are first etched through the handle wafer 340, to make vias with inclined side surfaces 365. The vias 360 may be formed using anisotropic wet etching of silicon handle wafer 340. This type of processing may create trenches that have angled walls of about 56 degrees. Deep reactive ion etching (DRIE) may also be used to create these vias with very step angles. Anisotropic wet etching may be preferred due to fact the etching can be performed in large batches and no expensive equipment is required to perform the etching. This may reduce the cost of manufacturing.

The handle wafer 340 may first be thinned, in order place the vias 360 closer together while accommodating the slope of inclined surfaces 365.

The silicon dioxide layer 350 between the handle wafer 340 and the device wafer 330 may then be wet etched. This process may create an important undercut feature, which are the surface contours 355 shown in FIG. 7. This process may also expose the silicon of the electrically isolated structures of the device such as the fulcrum of the beam 330 which is electrically connected to moveable fingers 370a and 370b, and the stationary fingers 380a and 380b.

Figure 8:
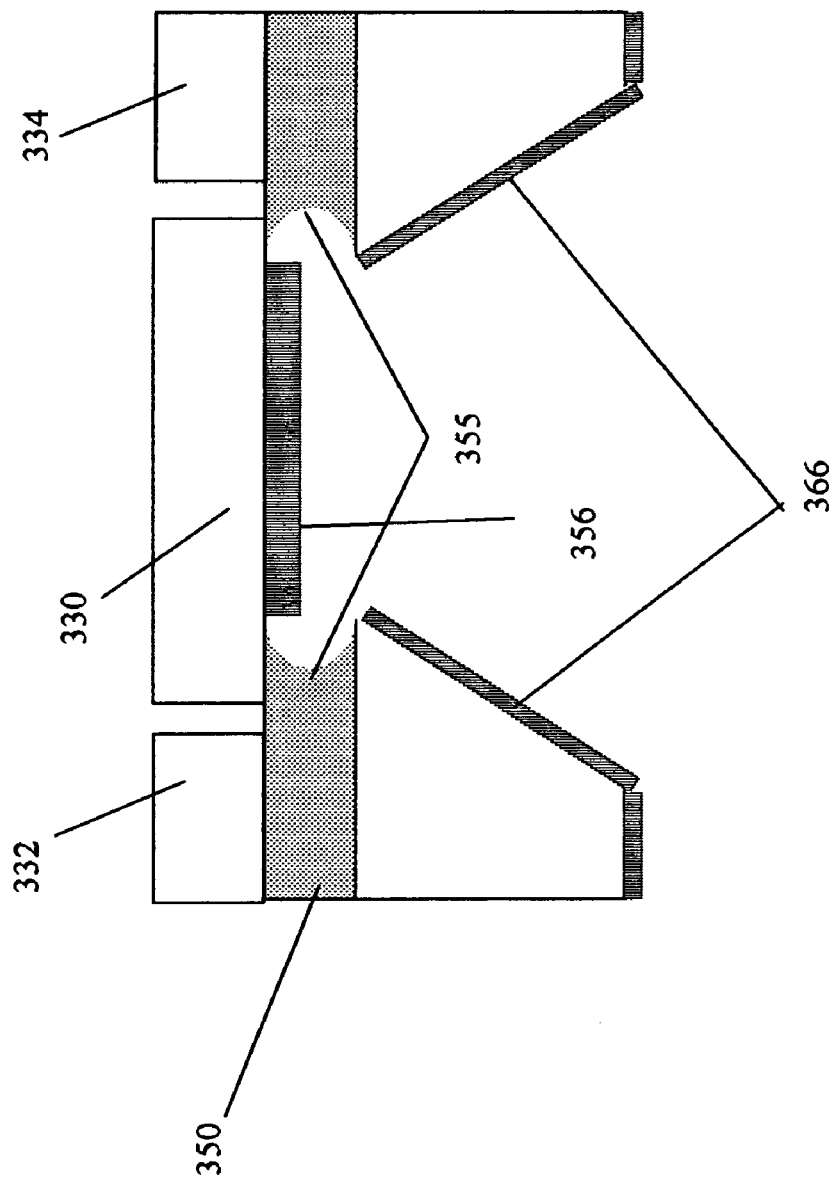
FIG. 8 is an illustration of an exemplary fabrication technique for making conductive connections for the teeter-totter accelerometer of FIG. 4.

Conductive layers 356 and 366 may then be deposited over the etched surfaces 355 and 365 as shown in FIG. 8. The conductive layer 356 and 366 may be of a type to create an electrical contact with the silicon, such as aluminum. Because of the undercut, the conductive film created by this deposition will not be continuous as shown in FIG. 8. Therefore, the conductive layer 356, deposited on the underside of crystalline or silicon layer 330 is electrically isolated from conductive layer 366. Therefore, contact may be made directly to conductive layer 356 without contacting other areas of the crystalline or amorphous silicon layer 330.

Conductive layer 356 may then used as a bonding pad for conventional wire-bonding techniques, such as ball-bonding, for example. Using such techniques, electrical connection may be made separately to each of the sides of the capacitor plates, 370a and 380a, and 370b and 380b. The silicon structure may be the electrical path between the bonding pads and the capacitive plates. Additional materials such as metals or polysilicon may be deposited or plated on the stationary and free structures to act as the electrical path between the wire bond pads and the capacitive plates. By monitoring the output of these electrical connections, the differential signal given by Eq. (1) may be obtained.

Figure 9:
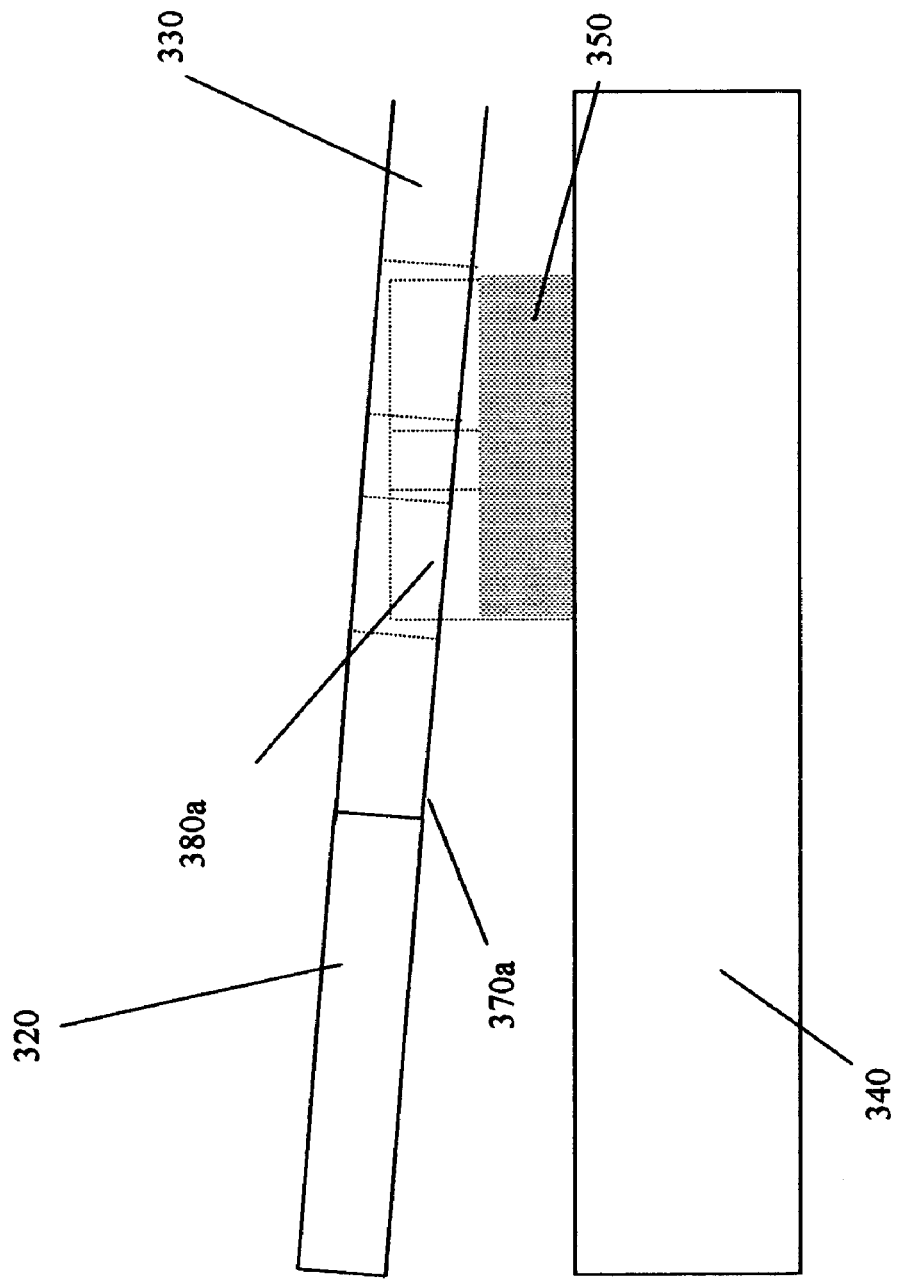
FIG. 9 is an illustration showing in greater detail the orientation of the interdigitated fingers of the teeter-totter accelerometer and their motion during operation.

FIG. 9 illustrates the functioning of the teeter-totter accelerometer 300, after the application of an acceleration. As indicated in FIG. 4, an acceleration applied upward along the axis 310 shown in FIG. 4, causes the teeter-totter accelerometer 300 to rotate in a clockwise direction. This rotation lifts the left side of the teeter-totter beam 330, and lowers the right side of the teeter-totter beam 330. As a result, the left side of the teeter-totter beam 330 may be displaced upward from its nominal position. This may cause the overlap of the two vertical plates of the capacitor, one belonging to the moveable finger 370a and the other belonging to the stationary finger 380a, to be reduced. This reduction in overlap also reduces the capacitance of the left side of the teeter-totter.

However, it should be clear that the right side of teeter-totter 300 may behave in a similar fashion, because the overlap of right side moveable finger 370b with right side stationary finger 380b is also reduced. Therefore, the change in capacitance of the left side of the teeter-totter beam is equal to (but not opposite from) the change in capacitance of the right side of the teeter-totter beam, and no differential output may be generated by teeter-totter accelerometer 300.

Figure 10:
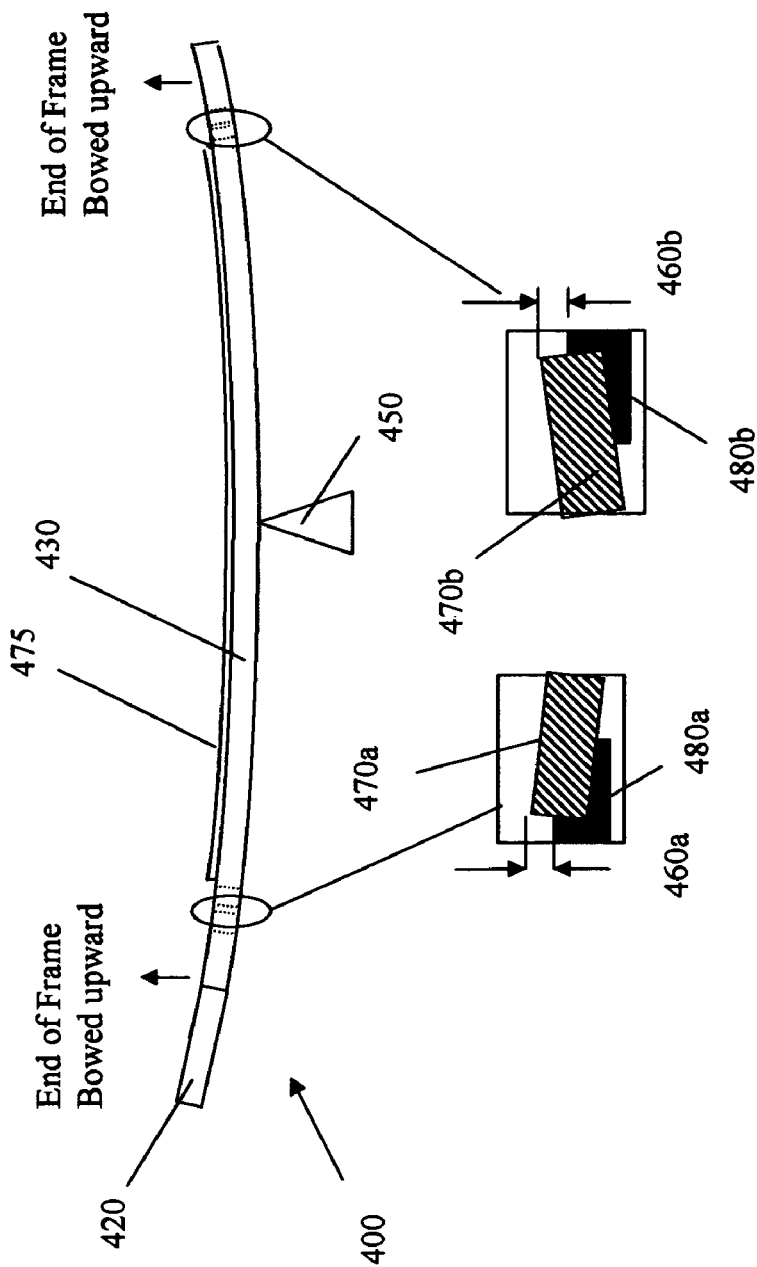
FIG. 10 shows the application of a stressed material to induce curving of the beam of the teeter-totter accelerometer.

In order to cause accelerometer 300 to generate a differential output, the beam 330 of accelerometer 300 may be curved out of the plane, for example, by inducing a curvature such as that shown in FIG. 10. It should be understood the curvature depicted in FIG. 10 may be greatly exaggerated, and that in actuality, the curvature imparted to the beam 430 of curved-beam teeter-totter accelerometer 400 may be much less dramatic. The curvature of the frame may only be great enough to assure the magnitude of upward displacement of the moveable fingers due to this curvature is greater than the expected movement during device operation or temperature excursions.

The curvature in beam 430 may be induced by, for example, depositing a stressed film 475 on the top of the teeter-totter beam 430, to produce the curved-beam teeter-totter accelerometer 400. Examples of suitable stressed materials include chrome and titanium. Alternatively, any other technique that results in imparting a stress in the upper surface of teeter-totter beam 430 may also be used, such as doping or texturing the top surface of beam 430.

Under nominal conditions (i.e., no acceleration), each end of the beam 430, that is, the left end 470a of beam 430 and the right end 470b of beam 430, is displaced a nominal distance 460a and 460b from the maximum overlap, because of the curvature of the beam 430. This simply reduces the capacitance signal from each bank of capacitor plates 470a and 480a and 470b and 480b. However, since the displacement 460a and 460b may be approximately the same for both sides of the curved-beam teeter-totter accelerometer 400, the change in capacitance does not contribute to a differential signal according to Eq. (1).

Figure 11:
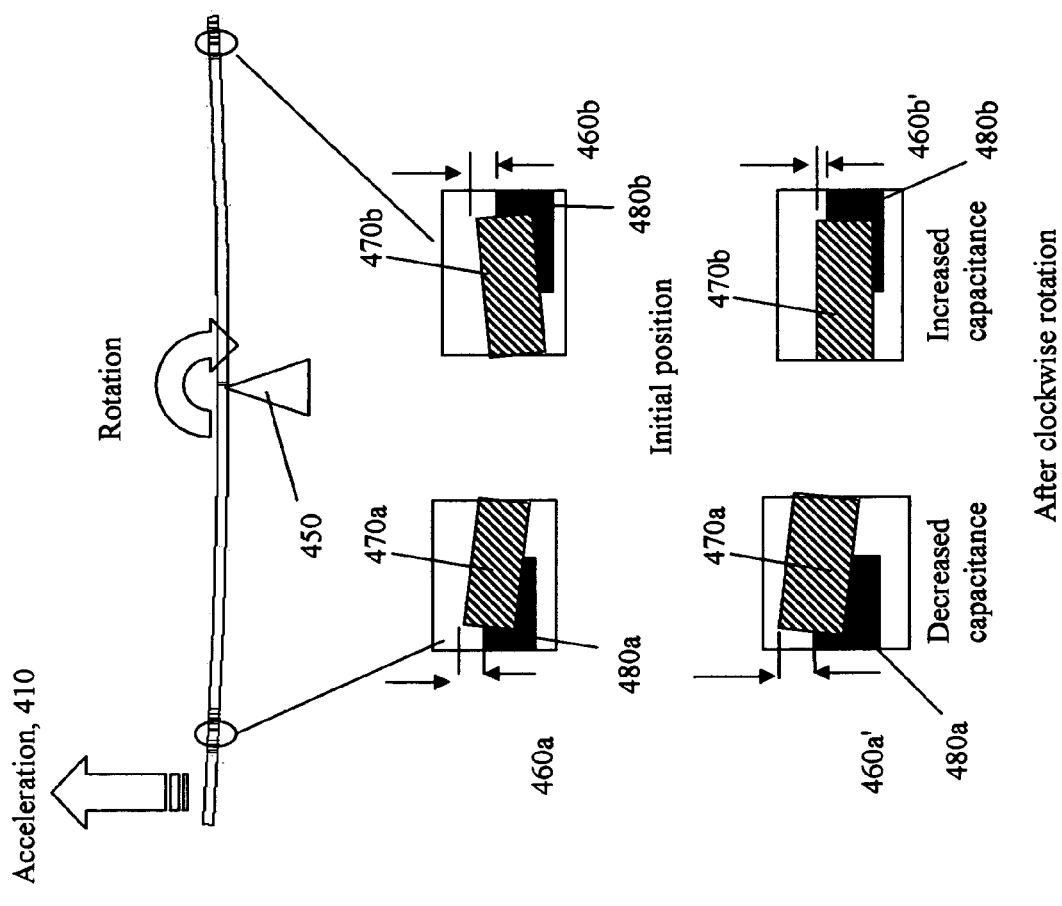
FIG. 11 illustrates the generation of a differential signal due to the curving of the beam of the teeter-totter accelerometer.

By causing beam 430 to bend out of the plane of the device, a differential sensor may be produced. This behavior is illustrated in FIG. 11. Before the application of the acceleration 410, the nominal displacement between moveable fingers 470a and stationary fingers 480a is 460a Similarly, on the right side of curved-beam teeter-totter accelerometer 400, the nominal displacement between moveable fingers 470b and stationary fingers 480b is 460b.

Upon application of the acceleration 410 shown in FIG. 11, the moveable fingers 470a of the left side of the curved-beam teeter-totter 400 move upward, and the moveable fingers 470b of the right side of the curved-beam teeter-totter accelerometer 400 move downward. The displacement of the moveable fingers of the left side of the curved-beam teeter-totter accelerometer 400 increases to 460a from 460a', and the displacement of the right side of curved-beam teeter-totter accelerometer 400 decreases to 460b' from 460b. As a result, on the left side, the overlap of the moveable fingers 470a with the stationary fingers 480a of the left capacitor bank may be reduced, thereby reducing the capacitance of the left capacitor bank of the curved-beam teeter-totter accelerometer 400. However, the right side of teeter-totter 400 may rotate downward, which increases the overlap of the moveable fingers 470b with the stationary fingers 480b, increasing the capacitance of the right capacitor bank. Accordingly, as the teeter-totter accelerometer 400 is rotated by the application of an acceleration, the response of the left capacitor bank a may be approximately equal and opposite to the response of the right capacitor bank b, and a differential signal may be produced according to Eq. (1).

Figure 12:
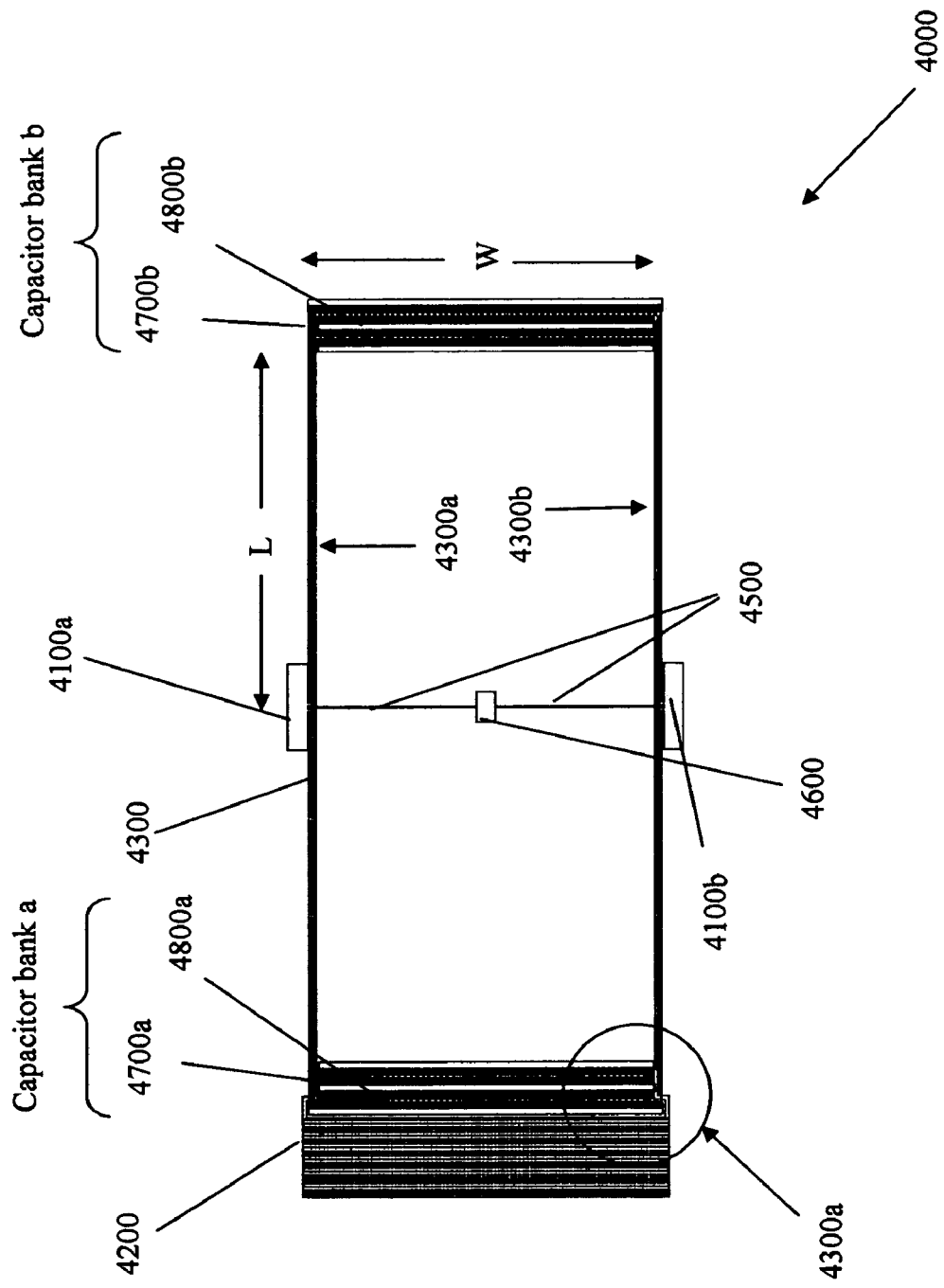
FIG. 12 is a plan view of the teeter-totter accelerometer, showing the frame and open areas.
Figure 15A:
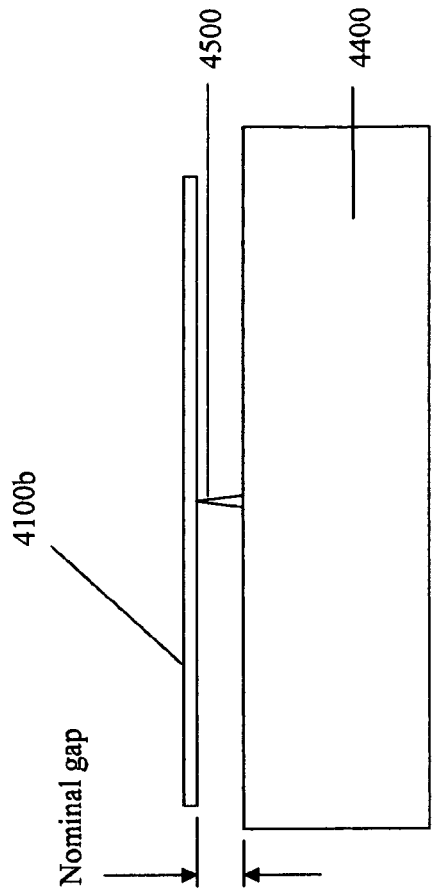
FIGS. 15a and 15b illustrate the operation of the damping plates shown in FIG. 14.
Figure 15B:
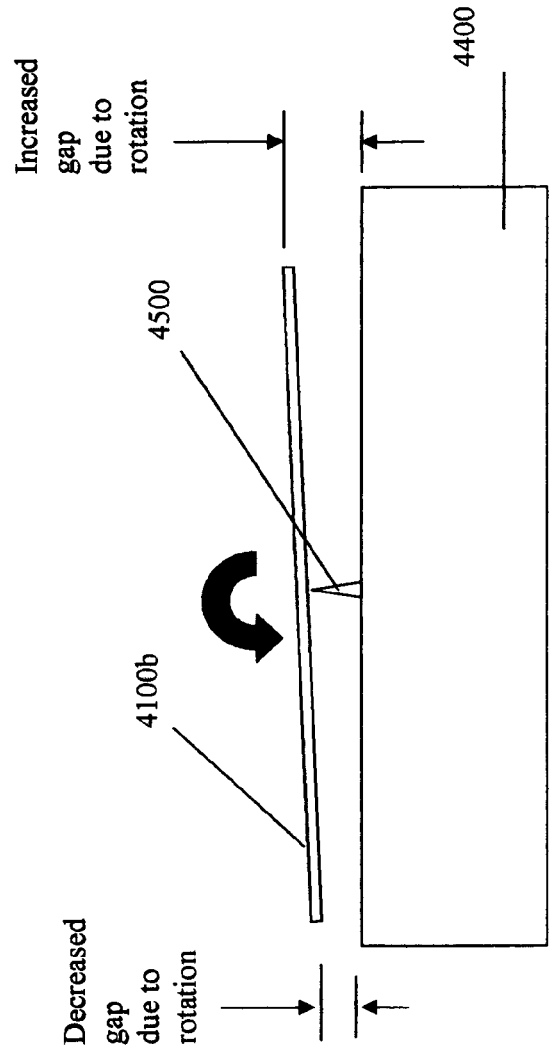

FIG. 12 is a plan view of curved-beam teeter-totter accelerometer 4000. The curved-beam teeter-totter accelerometer includes a frame 4300 mounted on at least two torsional springs 4500, which may be a remaining area of silicon anchored to the substrate by a silicon dioxide anchor 4600, which attaches the frame to the substrate 4400 (refer to FIGS. 15a and 15b). The torsional springs 4500 may be narrow isthmuses of silicon material which produce the torsional spring effect that restores the curved-beam teeter-totter accelerometer 4000 to its original position after the application of the acceleration The torsional springs 4500 can either be located on either the inside or outside of the frame 4300. When straight beams are used for torsional springs 4500, the springs 4500 may also be located outside of the frame 4300 to reduce the device sensitivity to accelerations orthogonal to the axis being measured by this device. Such an embodiment will be discussed with respect to FIG. 16, below.

The torsional springs 4500 are designed to be very stiff in the direction of the acceleration (out of the paper in FIG. 12) such that there is no movement in this direction other than that due to the rotation of the frame 4300. The torsional springs 4500 may be designed with a significantly high aspect ratio to achieve this out of plane stiffness while still maintaining the needed transverse and rotational stiffness. One method of achieving this may be to taper the torsional spring beam 4500 such that the beam is wider at the point where it connects to the stationary anchor and then narrows to a minimum width at the point where it connects to the free rotating frame 4300.

On either end of the frame 4300 may be groups of capacitor banks, capacitor bank a on the left side of the frame 4300 and capacitor bank b on the right side of frame 4300. Each of the capacitor banks may include a set of stationary fingers 4800a and 4800b, located nominally adjacent to a set of moveable fingers 4700a and 4700b. The moveable fingers 4700a and 4700b may be rigidly attached to, or defined by the frame 4300. The stationary fingers 4800a and 4800b may be rigidly attached to the base or handle wafer 4400 (refer to FIGS. 15a and 15b). In order to balance the mass of these moveable fingers 4700a and 4700b about the pivot point they may be symmetric and positioned at equal distance from the pivot point. A proof mass 4200 may then be coupled to one end of the frame 4300.

The stationary fingers 4800a and 4800b and the moving fingers 4700a and 4700b may be electrically isolated from each other. This isolation may be achieved by designing each of the stationary fingers 4800a or 4800b as one continuous silicon structure. Since the stationary fingers 4800a and 4800b and the frame 4300 are anchored to the silicon dioxide layer below and do not contact each other, they are each isolated electrically from each other and from other structures in the device. Electrical isolation may also be created using other methods such as metallization, but these methods may add cost. Because of this isolation there may be a finite capacitance between the stationary and moveable fingers. The resistive properties of silicon may allow it to be used to conduct small amounts of electrical current. Therefore the frame and stationary finger structures may need no other processing to allow for the measurement of the capacitance between them.

The teeter-totter frame 4300, may have been processed as described above to form the beams of the frame 4300 of the out of the plane of the teeter-totter accelerometer 4000. A film of tensile material may be placed on the top of the beams of the frame 4300 between the pivot point 4500 and the capacitor banks a and b. The tensile stress of this film may cause the beams of the frame 4300 to bow out of plane.

The design shown in FIG. 12 may be robust to thermal effects or variants in the stressed material. If the stress in the stressed material varies, the curvature of the frame may change, resulting in a slight change in device capacitance. As long as this curvature does not become large enough to allow the moveable fingers to travel beyond a position where they are protruding below the stationary fingers during operation, there may be no effect on the functionality of the accelerometer 4000. However, for example if the stressed material heats up, it may expand and reduce the magnitude of the curvature of the structure. This change may be the same on each side of the structure. If the reduction of curvature is sufficient that under some accelerations, the moving finger moves below the stationary finger, the capacitance may decrease rather than increase, as is needed for differential performance of the device.

The characteristic dimensions of the frame 4300 of curved-beam teeter-totter accelerometer 4000 may be its length L and width W, as shown in FIG. 12. These two dimensions may be chosen to accommodate various design factors. For example, the length L may be chosen so that the leverage applied by the proof mass under acceleration is adequate to deflect the moveable fingers 4700a and 4700b by an amount which produces an easily detectable change in capacitance. In one exemplary embodiment, the length L of the curved frame 4300 is 3,000 μm. The width of the frame 4300 may be chosen to allow an adequate number of interdigitated fingers, to again, produce the desired signal strength. The width W of the frame 4300 may only be limited by the rigidity required of the frame, so that it moves as essentially a single unit. If the width W is chosen to be too wide, the frame may become so flexible that it may no longer give a well-defined single value for the measured acceleration.

The frame 4300 may have a certain length L in the horizontal direction in order to get the needed bow of the curved-beam due to the stressed material, and the required rotational displacement with a set proof mass 4200 size and size restrictions of the torsional hinges 4500. In other words, if the frame 4300 is small, the proof mass 4200 may not have adequate leverage over the torsional springs 4500 so that either the torsional springs 4500 would have to be very thin, or the proof mass 4200 large. Another reason for the open area shown in FIG. 12 may be to provide space for patterning two in-place accelerometers to create a tri-axis accelerometer, as will be described further below with respect to FIG. 16. This may negate the negative impact of having a long frame 4300 to achieve better performance from the curved-beam teeter-totter accelerometer 4000.

Figure 13:
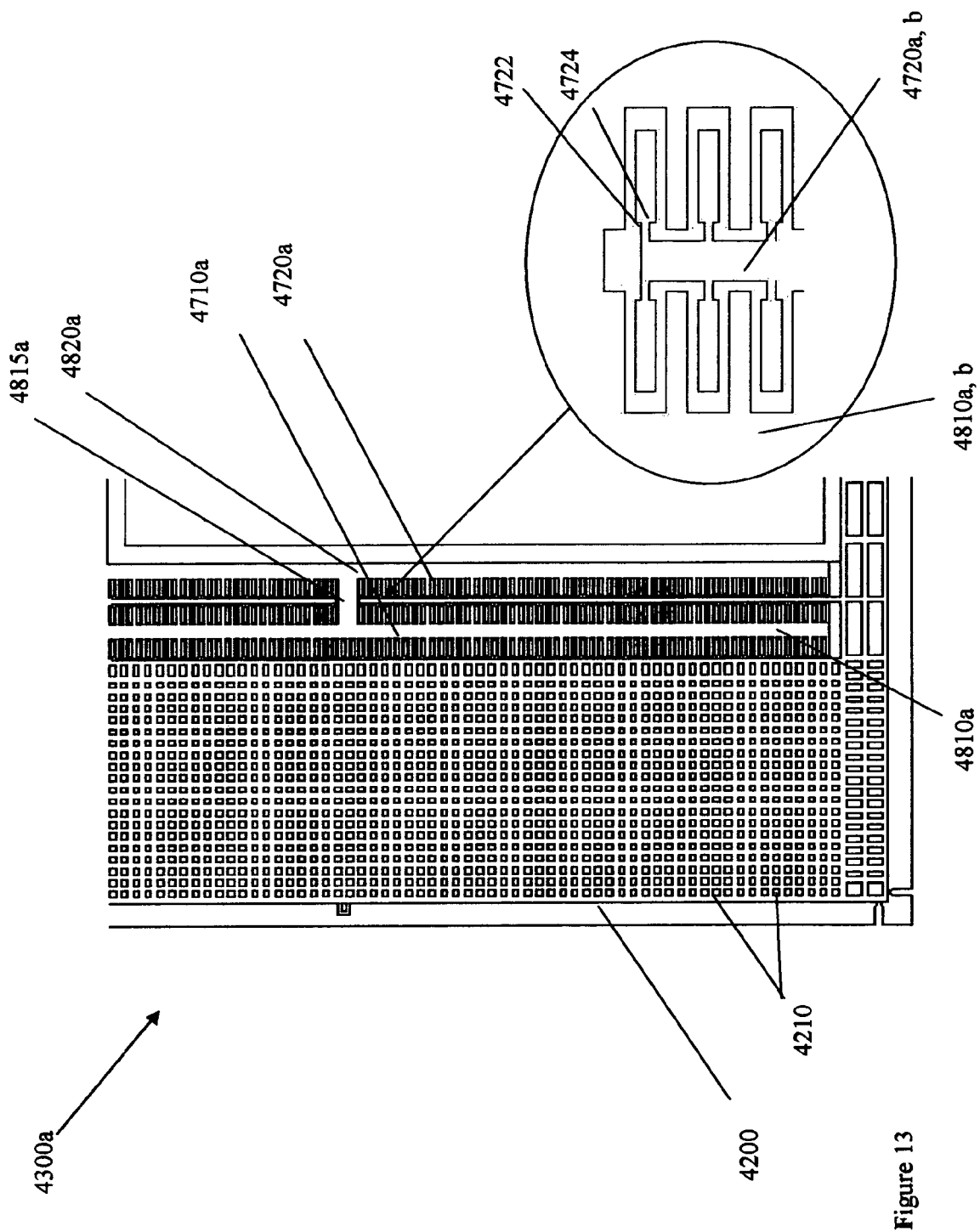
FIG. 13 shows additional detail of the proof mass and interdigitated fingers of the teeter-totter accelerometer illustrated in FIG. 12.

Detail of the left capacitor bank a, in the region indicated by reference number 4300a, is shown in FIG. 13. As shown in FIG. 13, the left capacitor bank a, may include two sets of moveable fingers 4710a and 4720a The first set of moveable fingers 4710a may be designed according to the layout shown in FIG. 5, with the moveable fingers largely surrounding the stationary fingers 4810a. Using this design, the proof mass, 4200, may be an extension of the material of the moveable fingers 4710a. The proof mass 4200 may be solid or have a plurality of through holes 4210 etched in it to control the damping effects and to facilitate the silicon dioxide release process.

The second set of moveable fingers 4720a may be designed according to the layout shown in FIG. 6, wherein the moveable fingers are largely surrounded by the stationary fingers 4820a.

There may be some linear movement in the plane of the frame 4300 of the device that accompanies the rotational movement. This may also have an effect on the capacitance change of the device. This change may be nonlinear, and therefore unwanted. In order to reduce this nonlinear effect, the moving fingers may be designed with an undercut feature at the base of the finger. This undercut feature may increase the gap between the fixed finger and the moving finger and thus decrease the capacitance change due to the in-plane component of the beam rotation. The undercuts are shown in the insert included in FIG. 13, showing detail of the shape of the moveable fingers 4720a. The insert shows that moveable fingers 4720a may have undercut regions 4722 and 4724. The removal of material in these regions may reduce the sensitivity of curved-beam teeter-totter accelerometer 4000 to in-plane accelerations, that is, accelerations parallel to the plane of the substrate. This feature may improve the sensitivity of the curved-beam teeter-totter accelerometer 4000 to out-of-plane accelerations, which it is primarily designed to detect. The curved-beam teeter-totter accelerometer may therefore have high sensitivity to accelerations in the range of 0.45 picoFarads (pF) per g of acceleration.

The stationary fingers 4820a corresponding to the second set of moveable fingers 4720a may be electrically connected to the stationary fingers 4810a corresponding to the first set of moveable fingers 4710a by a connecting beam 4815a Therefore, all of the interdigitated fingers of the left capacitor bank may produce, together, a single signal $S_a$.

Although not illustrated, it should be clear that the right hand side of curved-beam teeter-totter accelerometer 4000 may be of similar design to that detailed for the left side of curved-beam teeter-totter accelerometer 4000 in FIGS. 12 and 13.

A number of additional features may also be included in curved-beam teeter-totter accelerometer 4000. For example, two flat plates or paddles 4100a and 4100b may be disposed to the sides of the frame 4300 as shown in FIG. 12. The purpose of these plates 4100a and 4100b may be to damp vibrations occurring as a result of the deflection of the proof mass 4200 on the torsional spring 4500. The flat plates 4100a and b may be separated from the underlying substrate by a thin film of air, resulting from the removal of the remaining areas of the silicon dioxide layer 4500 in the SOI fabrication process. As the curved-beam teeter-totter accelerometer 4000 is rotated by an acceleration, the rotation results in the pivoting of the damping plates.

Figure 14:
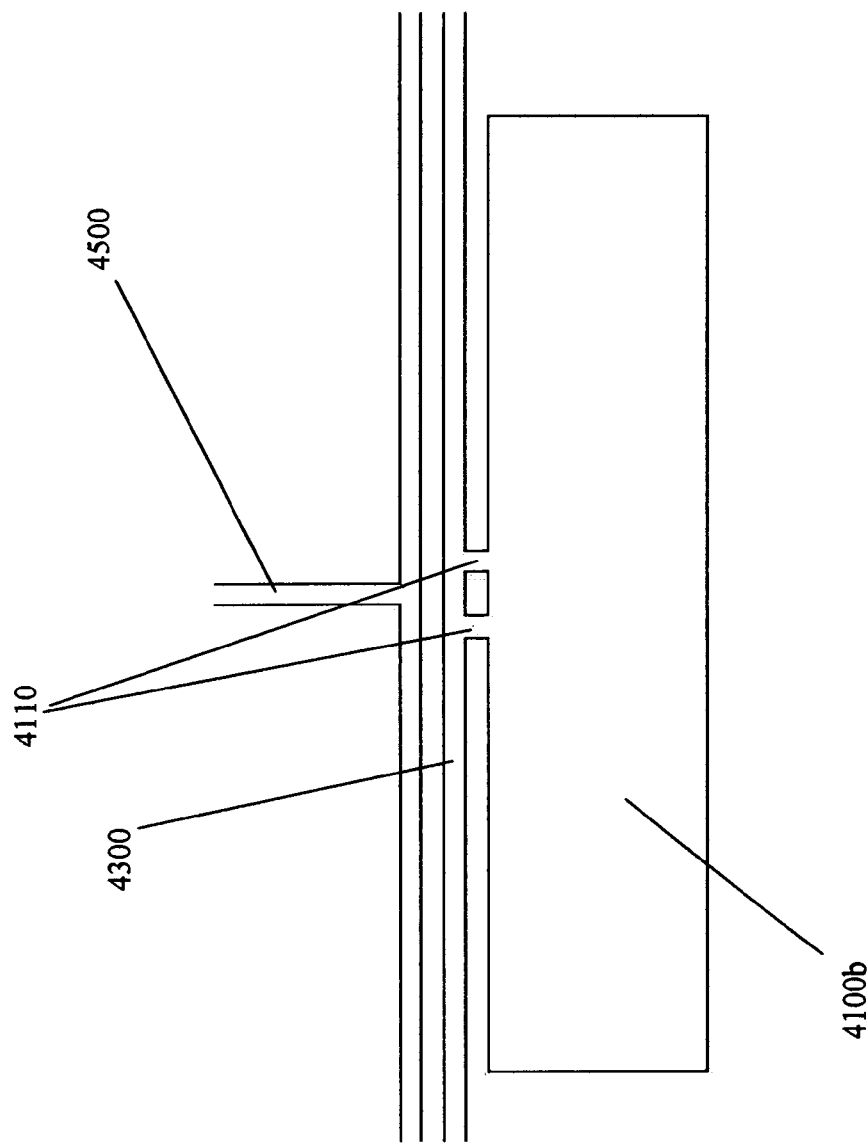
FIG. 14 shows additional detail of the damping plates of the curved-beam teeter-totter accelerometer of FIG. 12.

The lower damping plate 4100b is shown in greater detail in FIG. 14. The damping plate 4100b may be attached to the beam 4300 by at least one extension of material 4110. The beam 4300 in the region of extensions 4110 may not have the stressed material deposited upon it, so that it retains its flatness. As a result, the damping plates 4100b may be suspended parallel to, but slightly above, the substrate 4400. The disposition of the damping plate 4100b is shown in greater detail in FIG. 15a.

Before an acceleration event, the damping plate 4100b is substantially parallel to the substrate 4400. As an acceleration is applied to the curved-beam teeter-totter accelerometer 4000, the curved beams may respond by rotating under the force of the accelerating proof mass 4200. This rotation may cause the damping plate 4100b to rotate as well, about fulcrum 4500. In the example shown in FIG. 15b, the rotation is counter-clockwise, causing the left side of the plate 4100b to dip toward the substrate 4400, and the right side of the plate 4100b to rotate up and away from the substrate. This motion may cause a decreased gap between the curved beam and the substrate on the left side, and an increased gap between the curved beam and the substrate on the right side.

The change in the gap between the plates 4100a and 4100b and the base wafer 4400 may create squeeze film viscous damping. This type of damping may occur when two relatively large plates with a relatively small gap between them move towards or away from each other. This movement may force the gas between the two plates to the outside of the plates. The damping forces created by this phenomenon may be significantly larger than viscous damping due to drag. This type of damping may be proportional to the cube of the gap. The creation of the silicon dioxide layer of an SOI wafer is generally done using a thermal oxidation process. This process allows for very tight control of the thickness of the oxide. The design may use this layer to create the gap between the two damping plates, and therefore the thickness of the gap may be very tightly controlled.

The stressed material may only go on the horizontal beams of the frame 4300 between the attachment point of the damping paddles 4100a and 4100b and the start of the capacitor banks a and b. This may be done to prevent the damping paddles 4100a and 4100b from having any curvature. This curvature may increase the gap between the paddles and the handle wafer 4400 below, thus reducing the damping efficiency. Therefore these damping plates 4100a and 4100b will not be bowed out of plane and the gap will retain the tight tolerances inherent in the fabrication process. The stressed material may not be put on the capacitor banks as well, to avoid having the interdigitated fingers bend up and distort. The amount of damping may be controlled by the size and shape of the plates.

Figure 16:
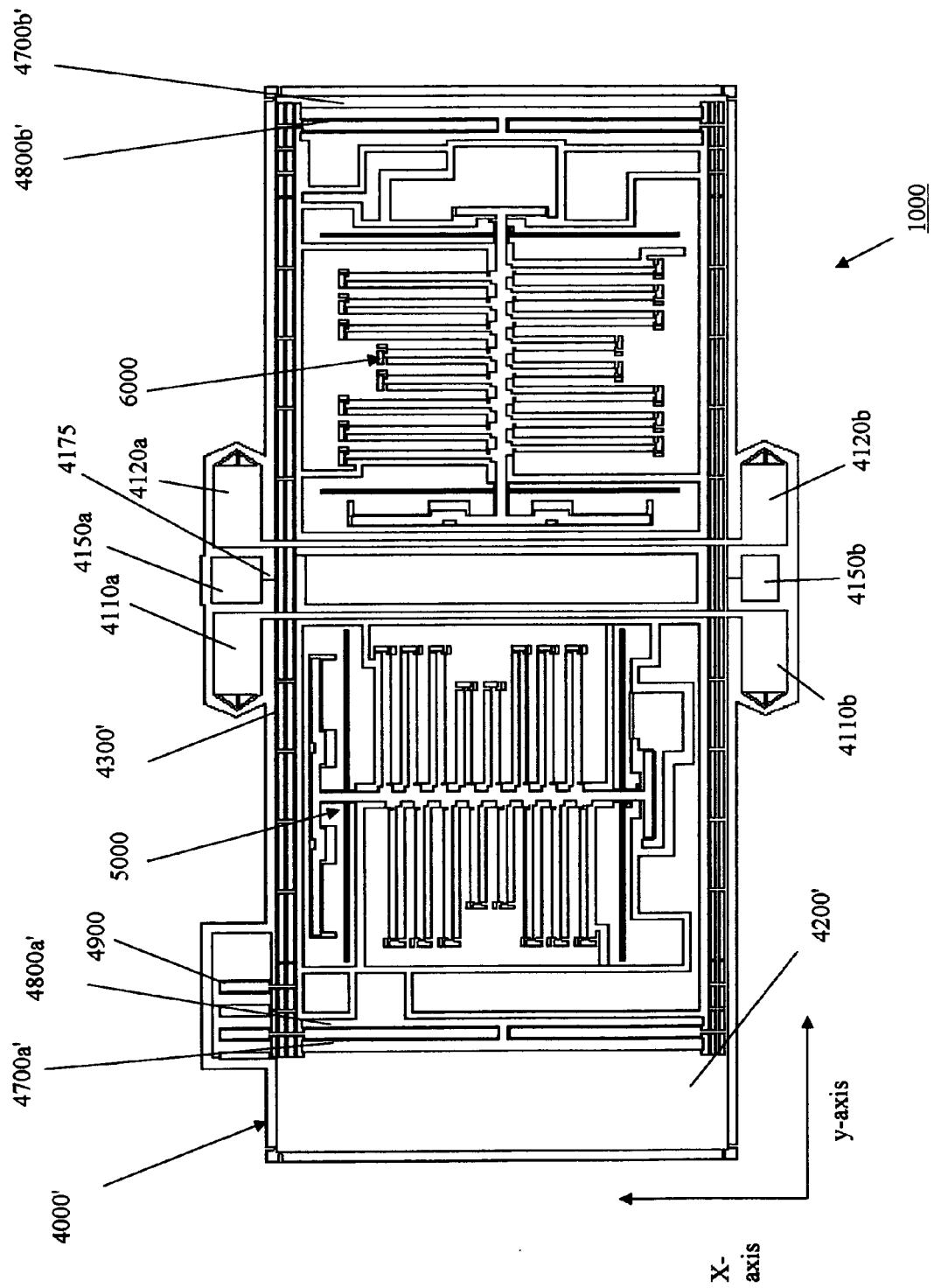
FIG. 16 is a plan view of an exemplary three-dimensional accelerometer.

FIG. 16 shows a three-dimensional accelerometer, based on a curved-beam teeter-totter accelerometer similar to that depicted in FIG. 12. In the three-dimensional accelerometer, an x-axis accelerometer 5000 and y-axis accelerometer 6000 may be placed within the open area of the frame 4300' of curved-beam teeter-totter accelerometer 4000'. For clarity, the stationary fingers 4800a' and 4800b', and the moveable fingers 4700a' and 4700b' are shown only schematically, and the detail of these features may be as depicted in FIG. 13. In contrast to the monolithic damping plate 4100a of FIG. 12, curved-beam teeter-totter accelerometer 4000' may have a pair of damping paddles 4110a and 4120a which straddle the anchor 4150a for curved-beam teeter-totter accelerometer 4000'. The anchor 4150a may be connected to the curved-beam teeter-totter frame 4300' by a torsional hinge 4175. This design has the advantage of allowing the torsional hinge 4175 to be disposed outside of the frame 4300', rather than inside the frame 4300 as in curved-beam teeter-totter accelerometer 4000. As a result of such a placement of the torsional hinge 4175, the curved-beam teeter-totter accelerometer 4000' may be less sensitive to accelerations orthogonal to the axis being measured by this device, while also providing more room for the inclusion of accelerometers 5000 and 6000. Curved-beam teeter-totter accelerometer 4000' may also have a self test area 4900, which may be used to assess the functionality of the device before fabrication has been completed.

Figure 17:
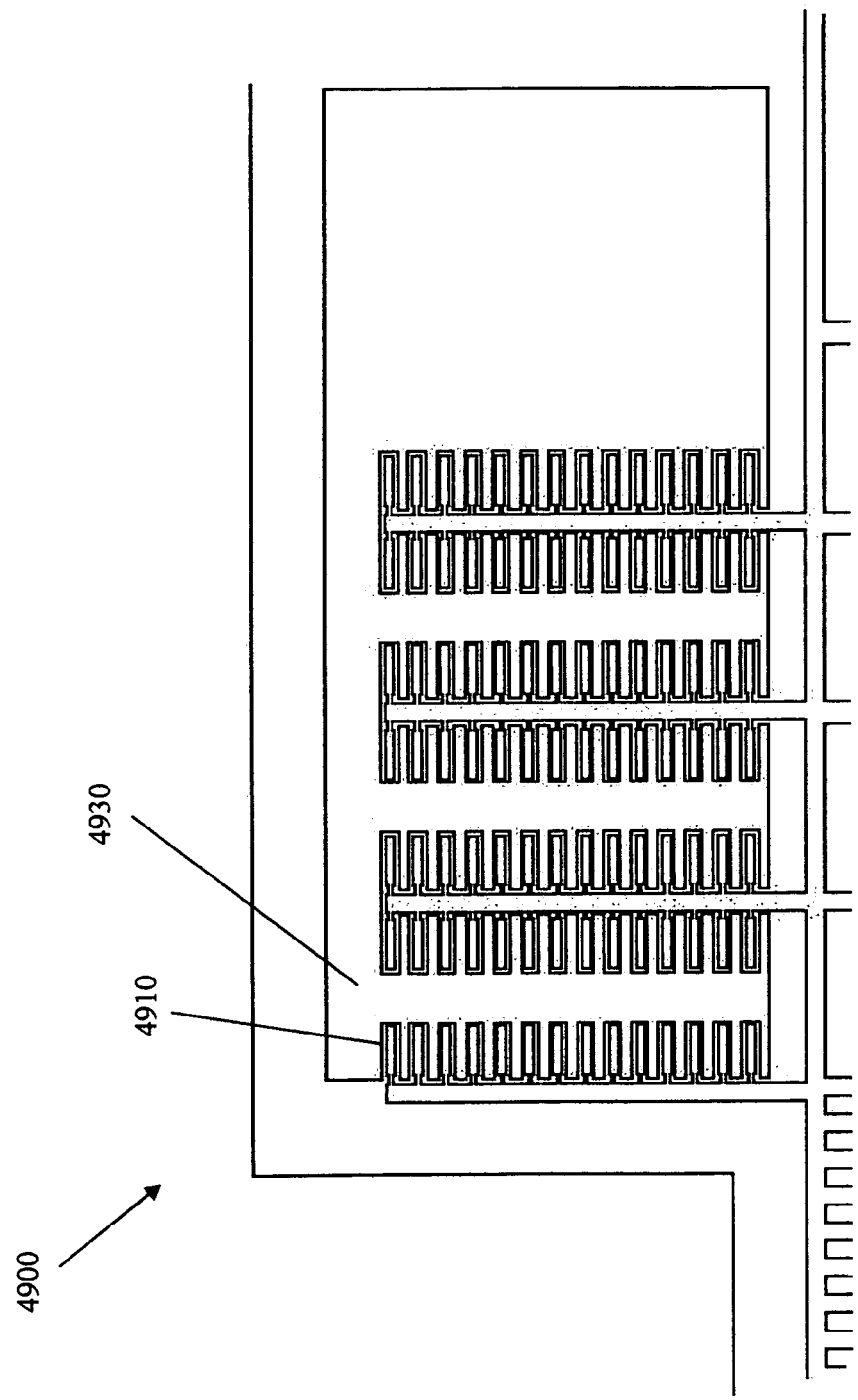
FIG. 17 shows the self-test area of the accelerometer of FIG. 16 in greater detail.

FIG. 17 shows further detail of the self-test area 4900 of curved-beam teeter-totter accelerometer 4000'. The self-test area 4900 may include a set of moveable fingers 4910 interdigitated with a set of stationary fingers 4930. By applying a voltage between moveable fingers 4910 and stationary fingers 4930, the moveable fingers may be induced toward a greater or lesser overlap with stationary fingers 4930. Therefore, by energizing the self-test area of the capacitor combs, the curved-beam teeter-totter accelerometer may be caused to move, thereby testing the functionality of the device 4000'. The movement of the curved-beam teeter-totter accelerometer 4000' may be inferred from a change in capacitance as a result of the application of the voltage, or by a vibratory movement cause by energizing the capacitor plates 4910 and 4930. Failure to detect movement of the curved-beam teeter totter accelerometer 4000' may indicate that the frame 4300' has been improperly or incompletely released from the substrate, or that stiction is adhering the frame 4300' to the substrate, or that the device is electrically malfunctioning. In any case, if the proper functioning of the device is not confirmed, a decision may be made to discard the device or the entire wafer, before completing the fabrication of the device and therefore investing more time and money into a failed device or set of devices.

Figure 18:
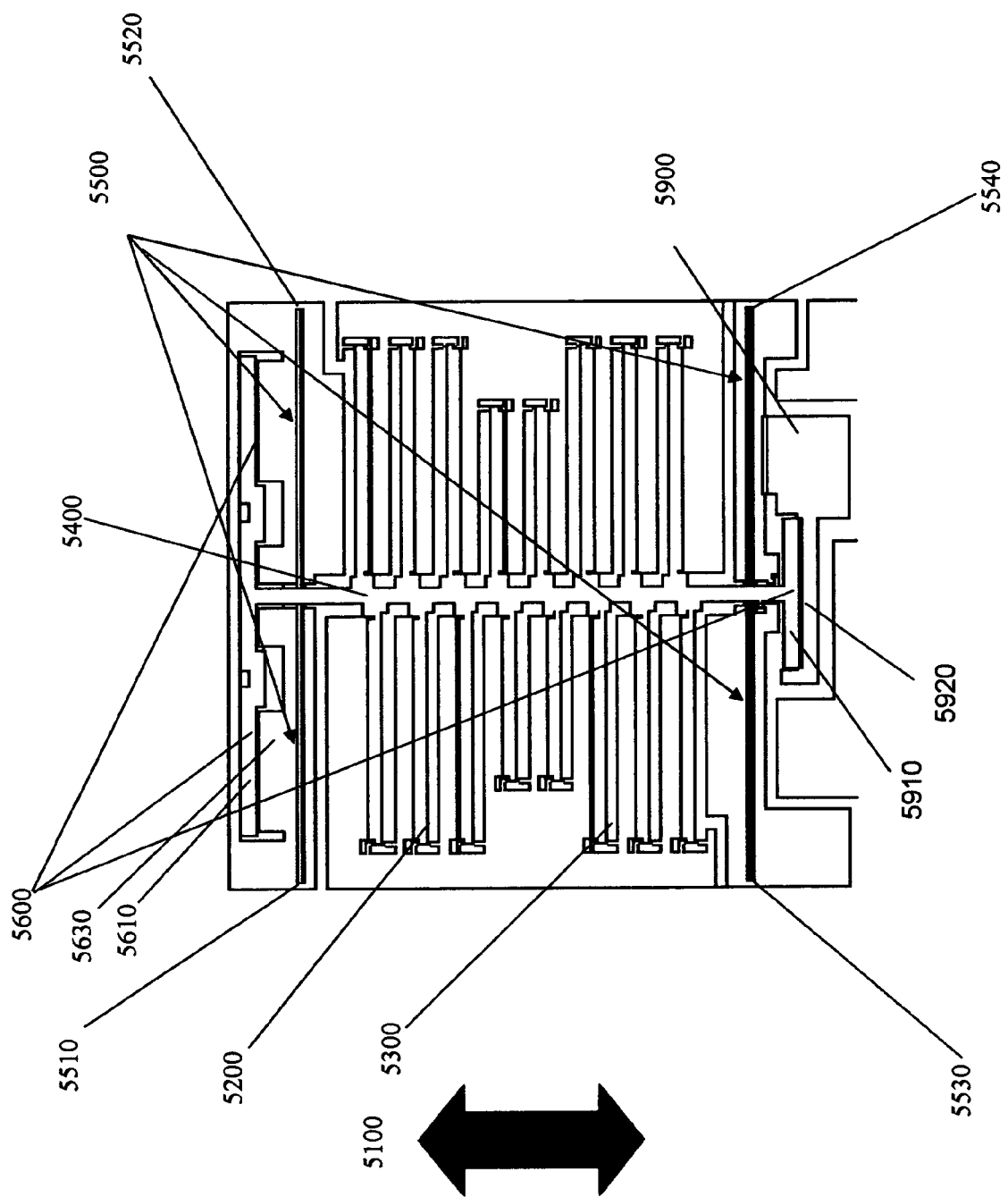
FIG. 18 shows the x-axis accelerometer of FIG. 16 in greater detail.

An exemplary embodiment of the x-axis accelerometer 5000 is shown in FIG. 18. Similar to the curved-beam teeter-totter accelerometer 4000, the x-axis accelerometer 5000 may also be constructed in a planar fashion using lithographic patterning, and may be fabricated at the same time as curved-beam teeter-totter accelerometer 4000. The x-axis accelerometer is designed as an H-beam structure, with four cantilevered springs 5500. One end of each cantilevered spring 5500 is attached to a stationary anchor point, designated 5510, 5520, 5530 and 5540 in FIG. 18. The other end of each cantilevered spring 5500 is connected to a rigid beam 5400. Because of the attachment of the cantilevered springs 5500, the rigid beam 5400 is capable of moving along the axis 5100 shown in FIG. 18.

The rigid beam 5400 may therefore move in plane. As it moves the four cantilevered springs 5500 may guide it in a straight direction and apply a force trying to restore the rigid beam 5400 to its starting position.

In the x-axis and y-axis accelerometers 5000 and 6000, the entire moving structure may be the proof mass.

The x-axis accelerometer 5000 nay have two capacitor banks, an upper capacitor bank 5200 and a lower capacitor bank 5300. For clarity of depiction, the individual elements of the interdigitated capacitor fingers are not shown in FIG. 18. Each of the upper and lower capacitor banks may have a set of moveable fingers, and a set of stationary fingers respectively. In the upper capacitor bank 5200, the stationary fingers may be placed above the moveable fingers, and in the lower capacitor bank 5300, the stationary fingers may be placed below the moveable fingers. Therefore, in the presence of an upward acceleration, for example, the rigid beam 5400 may move upward, along with moveable fingers to which it is attached. However, the motion of the rigid beam 5400 may be constrained by the cantilevered springs 5500. At the point at which the restoring force of the cantilevered springs exceeds the inertia of the rigid beam 5400, the rigid beam 5400 ceases to move upward. At this point, however, the capacitance of the upper capacitor bank 5200 has increased, and the capacitance of the lower capacitor bank 5300 has decreased, because the overlap of the capacitor plates in the upper capacitor bank 5200 has increased, whereas the overlap of the capacitor plates in the lower capacitor bank 5300 has decreased. Therefore, according to Eq. (1), the upper and lower banks 5200 and 5300 of the x-axis accelerometer 5000 may produce a differential signal which is indicative of the magnitude of the acceleration along the x-axis.

Damping plates may also be provided for the x-axis and y-axis accelerometers 5000 and 6000. To create controlled damping, damping plates are created on the moving structure and in electrically separated islands. The damping plates may be provided in the regions indicated by reference number 5600 in FIG. 18. The damping plates are one or more moveable flat plates 5630 which are disposed adjacent to one or more stationary flat plates 5610. The stationary flat plates 5610 may be formed from a portion of the device layer of an SOI wafer which is still adhered to the handle wafer by the silicon dioxide layer.

The distance between moveable flat plates 5610 and stationary flat plates 5630 may be lithographically defined, and so may be made very small. The distance may define an area in which a squeeze film may be created, similar to that created under damping plates 4100a and 4100b of curved-beam teeter-totter accelerometer 4000. As the x-axis accelerometer structure 5400 moves laterally, it may create a vacuum pressure which may tend to draw air into the gap created by the laterally moving flat plates 5610, relative to the stationary flat plates 5630 or force air out from between the moving flat plates 5610 and the stationary flat plates 5630. The viscosity of the air causes a drag on the movement of flat plates 5610, slowing their motion and therefore, that of the rigid beam 5400. The gaps, size, and quantity of the stationary flat plates 5630 and moveable flat plates 5610 may be changed to create an optimum damped system A similarly functioning set of damping plates may be located at the bottom of the rigid beam structure 5400, as shown in FIG. 18.

The beams of the x-axis accelerometer 5000 may be prevented from moving a distance equal to the gap between the moveable flat plates 5610 the stationary flat plates 5630 by an anchored feature (not shown) that the rigid beam 5400 hits. The gap between the anchored feature, referred to as a crash stop, may be less than the gap between the moveable flat plates 5610 the stationary flat plates 5630. The damping plates are arranged, in general, close to the center of the device where the force created by the damping is concentrated on the rigid beam 5400 of the structure 5000.

X-axis accelerometer 5000 may also have a self-test area 5900, similar in function to self-test area 4900 of curved-beam teeter-totter accelerometer 4000'. In this case the self test may include a moving plate 5910 and a stationary flat plate 5920 that are similar to the flat plates 5610 and 5630 used for damping and described earlier. A voltage may be applied between the stationary flat plate 5920 and the moving flat plate 5910. This voltage may induce a force on the moving flat plate 5910 thus drawing the moving flat plate 5910 toward the stationary flat plate 5920, or pushing the moving flat plate 5910 away from the stationary flat plate 5920. The resulting motion of the x-axis accelerometer 5000 may indicate that the x-axis accelerometer 5000 is functioning properly. If higher levels of force were required to move the X-axis accelerometer, a set of moveable fingers may be formed interdigitated with a set of stationary fingers, such that a voltage may be applied between the moveable fingers and the stationary fingers to induce a movement of the moveable fingers toward, or away from, the stationary fingers. Since the stationary plate 5920 and moving plate 5910 closely mimic the stationary plates 5630 and moving plates 5610 used for damping of the X-axis accelerometer, the self test plates may be designed to serve both purposes.

It should be understood that the y-axis accelerometer 6000 may be of a design similar to the x-axis accelerometer 5000, only rotated 90 degrees so that its axis of sensitivity is perpendicular to that of the x-axis accelerometer 5000.

Because each of accelerometers 4000, 5000 and 6000 may be made using MEMS lithographic processing, they may also be fabricated using batch processing of a single SOI wafer 305. Upon completion of the accelerometer devices 4000, 5000 and 6000, the finished SOI wafer 305 may be encapsulated using a simple and economical packaging concept. The MEMS accelerometer devices 4000, 5000 and 6000 may be sealed or protected by bonding a wafer on top of the MEMS wafer. The second wafer acts like a cap to seal the MEMS devices 4000, 5000 and 6000. Since the capping is done at wafer level, there may be significant benefit in cost due to a large number of devices being sealed at one time and the fact that the devices are sealed prior to dicing the wafer. This capping process may eliminate the possibility of contaminating the accelerometer devices 4000, 5000 and 6000 during the dicing separation.

The MEMS SOI wafer 305 (refer to FIG. 3) may be covered by anodically bonding a glass wafer to the MEMS device wafer 308. One side of the glass wafer may have reliefs etched into it to allow movement of the MEMS curved-beam teeter-totter accelerometer 4000 out of plane. The depth of these reliefs may be significant to eliminate the ability of the voltage potential applied during the anodic bonding process to damage the frame 4300 of the curved-beam teeter-totter accelerometer 4000. In the areas above the end of the frame 4300, small shallow cavities may be etched into the glass wafer. These areas may act as over travel stops for the frame 4300. Because of this unique design, over travel stops need not be created underneath the structure, but instead may be incorporated into the lid.

During anodic bonding, a significant electric potential may be applied between the glass and silicon wafer. The potential may create a force that may pull the frame 4300 toward the glass wafer. When the frame 4300 comes into contact with the glass wafer it may bond to the glass wafer. In order to prevent this bonding, a small amount of stressed or other non adhering material may be deposited in the areas where the contact will occur. By so doing, the unwanted bonding of the frame to the glass wafer may be prevented because the stressed material may not allow for an anodic bond. AU the reliefs in the glass wafer may be created by wet etching.

Once the glass wafer is bonded, the handle wafer 306 may be thinned down by a lapping process. This is done to allow for the pitch between electrical vias to be smaller since the wet etching process to form the vias creates a significant side wall angle.

Electrical connections for the devices may then be achieved by creating vias through the silicon handle wafer and connecting to the isolated islands of silicon on the device wafer, as described above with respect to FIGS. 7 and 8.

While various details have been described in conjunction with the exemplary implementations outlined above, various alternatives, modifications, variations, improvements, and/ or substantial equivalents, whether known or that are or may be presently unforeseen, may become apparent upon reviewing the foregoing disclosure. While the embodiment described above relates to a curved-beam teeter-totter, with the curvature induced by a stressed material, this embodiment should be understood to be illustrative only, and the systems and methods may apply to any number of alternative accelerometer devices, including, for example, beams whose curvature is induced by surface texturing, for example. Techniques and design considerations described herein may also be used to fabricate push/pull actuators. Furthermore, details relating to the layout of the interdigitated fingers, and the number thereof, are intended to be illustrative only, and the invention is not limited to such embodiments. Accordingly, the exemplary implementations set forth above, are intended to be illustrative, not limiting.

What is claimed is:

1. A teeter-totter apparatus, comprising:
    at least one curved beam which pivots on a pivot point coupled to a surface of a substrate, and which is coupled to at least one moveable plate of a capacitor;
    a proof mass coupled to one end of the curved beam;
    at least one stationary structure coupled to the substrate which defines at least one stationary plate of the capacitor, wherein the moveable plate and the stationary plate are oriented perpendicular to a plane defined by the substrate surface.

2. The apparatus of claim 1, wherein the curved beam rotates about an axis substantially parallel to the substrate surface in response to an acceleration in a direction substantially perpendicular to the substrate surface.

3. The apparatus of claim 2, wherein the at least one moveable plate and the at least one stationary plate are defined by at least two sets of interdigitated fingers, each located near an end of the curved beam wherein the interdigitated fingers are configured to generate a signal representative of the acceleration based on a difference between the capacitance of one set of interdigitated fingers and the capacitance of the other set of interdigitated fingers.

4. The apparatus of claim 1, wherein the curved beam comprises a stressed material.

5. The apparatus of claim 4, wherein the stressed material is at least one of chrome and titanium.

6. The apparatus of claim 2, wherein the at least one curved beam comprises two curved beams which define two sides of a frame, wherein the frame rotates about an axis substantially parallel to the substrate surface.

7. The apparatus of claim 6, wherein the frame encloses at least one additional accelerometer, which is sensitive to an acceleration in a direction orthogonal to a direction of motion of the teeter-totter apparatus.

8. The apparatus of claim 2, further comprising:
    at least one damping plate coupled to the at least one curved beam, which damps a motion of the curved beam.

9. The apparatus of claim 2, wherein the pivot point provides a restoring force which resists the pivoting of the curved beam about the pivot point.

10. The apparatus of claim 2, further comprising at least one self-test structure, which exerts a force on the teeter-totter apparatus to test the functionality of the teeter-totter apparatus.

11. The apparatus of claim 2, wherein the curved beam has a curvature resulting from texturing a surface of the beam.

12. The apparatus of claim 2, wherein the stationary plate is electrically isolated from the moveable plate.

13. The apparatus of claim 12, further comprising electrical connections made to the stationary plate and the moveable plate through vias made in the substrate.

14. The apparatus of claim 2, wherein the teeter-totter apparatus is formed on a silicon-on-insulator wafer comprising a silicon device layer, an insulating layer, and a silicon handle layer.

15. A method for fabricating an apparatus on a substrate, comprising:
    forming at least one curved beam which rotates about an axis substantially parallel to a substrate surface;
    forming at least one moveable plate of a capacitor on the curved beam;
    forming at least one stationary structure coupled to the substrate which defines at least one stationary plate of the capacitor, wherein the moveable plate and the stationary plate are oriented substantially perpendicularly to a plane defined by the substrate surface;
    forming a proof mass on at least one end of the curved beam; and
    forming electrical connections to the stationary plate and the moveable plate, which generate a signal indicative of an acceleration in a direction substantially perpendicular to the substrate surface, by detecting a rotation of the curved beam.

16. The method of claim 15, further comprising forming at least one damping plate coupled to the at least one curved beam.

17. The method of claim 15, wherein the substrate is a silicon-on-insulator wafer.

18. The method of claim 17, wherein forming electrical connections comprises:
    forming at least one via through a handle layer of the silicon-on-insulator wafer;
    over-etching an insulating layer of the silicon-on-insulator wafer through the at least one via; and
    depositing a conducting layer in the at least one via.

19. The method of claim 18, further comprising:
    coupling at least one wire to the conducting layer in the at least one via.

20. A method for measuring an acceleration in a direction substantially perpendicular to the surface of the substrate with the teeter-totter apparatus of claim 3, comprising:
    measuring a first capacitance from a first of the two sets of interdigitated fingers;
    measuring a second capacitance from a second of the two sets of interdigitated fingers; and
    subtracting the first capacitance from the second capacitance, to generate a differential signal indicative of the rotation of the curved beam about the axis.

* * * * *